US012099381B2

(12) United States Patent
Hung et al.

(10) Patent No.: US 12,099,381 B2
(45) Date of Patent: Sep. 24, 2024

(54) PORTABLE ELECTRONIC DEVICE

(71) Applicants: Hsiao-Ching Hung, Taipei (TW); I-Lung Chen, Taipei (TW); Chien-Lun Sun, Taipei (TW); Wang-Hung Yeh, Taipei (TW); Hong-Tien Wang, Taipei (TW)

(72) Inventors: Hsiao-Ching Hung, Taipei (TW); I-Lung Chen, Taipei (TW); Chien-Lun Sun, Taipei (TW); Wang-Hung Yeh, Taipei (TW); Hong-Tien Wang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 44 days.

(21) Appl. No.: 17/732,489

(22) Filed: Apr. 28, 2022

(65) Prior Publication Data

US 2022/0357771 A1 Nov. 10, 2022

Related U.S. Application Data

(60) Provisional application No. 63/184,802, filed on May 6, 2021.

(51) Int. Cl.
*G06F 1/16* (2006.01)
*G06F 1/20* (2006.01)

(52) U.S. Cl.
CPC .......... *G06F 1/1624* (2013.01); *G06F 1/1652* (2013.01); *G06F 1/1681* (2013.01); *G06F 1/1686* (2013.01); *G06F 1/1688* (2013.01); *G06F 1/203* (2013.01)

(58) Field of Classification Search
CPC ........ G06F 1/1616; G06F 1/1681; G06F 1/20; G06F 1/1624; G06F 1/1637; G06F 1/166; G06F 1/203
See application file for complete search history.

(56) References Cited

U.S. PATENT DOCUMENTS

| 7,492,891 B2* | 2/2009 | Eldon | H04M 1/0247 |
| | | | 455/575.4 |
| 10,254,803 B1* | 4/2019 | Quinn | G06F 1/1688 |
| 10,754,390 B2* | 8/2020 | Quinn | G06F 1/1669 |

(Continued)

FOREIGN PATENT DOCUMENTS

| TW | 201239588 | 10/2012 |
| TW | M568990 | 10/2018 |
| TW | 202034142 | 9/2020 |

OTHER PUBLICATIONS

"Office Action of Taiwan Counterpart Application", issued on Sep. 5, 2022, p. 1-p. 6.

*Primary Examiner* — Imani N Hayman
*Assistant Examiner* — Theron S Milliser
(74) *Attorney, Agent, or Firm* — JCIPRNET

(57) ABSTRACT

A portable electronic device including a first body, a first hinge, a second body, a second hinge, a third body, and an input module is provided. The second body is pivotally connected to the first body via the first hinge. The third body is pivotally connected to the second body via the second hinge, and the second body is located between the first body and the third body. The input module is slidably disposed on the third body and covers the second body. As the input module is slid away from the second hinge, the second body is moved out of the input module.

30 Claims, 19 Drawing Sheets

(56) References Cited

U.S. PATENT DOCUMENTS

| | | | |
|---|---|---|---|
| 10,936,020 B2* | 3/2021 | Chang | G06F 1/1692 |
| 10,996,719 B2* | 5/2021 | Quinn | G06F 1/1624 |
| 11,126,227 B2* | 9/2021 | Li | G06F 1/1649 |
| 11,262,794 B2* | 3/2022 | Wen | G06F 3/0202 |
| 11,347,367 B2* | 5/2022 | Hong | G06F 1/1641 |
| 11,527,736 B2* | 12/2022 | Ha | H10K 50/84 |
| 11,573,611 B2* | 2/2023 | Channaiah | G06F 1/1681 |
| 11,586,296 B2* | 2/2023 | Morrison | G06F 3/0393 |
| 11,703,909 B2* | 7/2023 | Wen | G06F 1/1688 345/168 |
| 11,841,744 B2* | 12/2023 | Kim | G06F 1/1649 |
| 2004/0108968 A1* | 6/2004 | Finke-Anlauff | G06F 1/1616 345/1.1 |
| 2006/0198513 A1* | 9/2006 | Eldon | G06F 1/1679 455/575.1 |
| 2007/0097014 A1* | 5/2007 | Solomon | G06F 1/1616 345/1.1 |
| 2010/0053876 A1 | 3/2010 | Widmer et al. | |
| 2013/0120912 A1* | 5/2013 | Ladouceur | G06F 1/1616 361/679.01 |
| 2020/0042045 A1* | 2/2020 | Quinn | G06F 1/1624 |
| 2020/0081498 A1* | 3/2020 | Chang | G06F 1/1679 |
| 2020/0089280 A1* | 3/2020 | Li | G06F 1/1649 |
| 2020/0233536 A1* | 7/2020 | Hong | G06F 1/1641 |
| 2020/0310496 A1* | 10/2020 | Quinn | G06F 1/1669 |
| 2020/0371563 A1 | 11/2020 | Collins et al. | |
| 2021/0064096 A1* | 3/2021 | Channaiah | G06F 1/1679 |
| 2021/0232234 A1* | 7/2021 | Morrison | G06F 1/1681 |
| 2021/0328175 A1* | 10/2021 | Ha | H10K 50/84 |
| 2021/0333840 A1* | 10/2021 | Channaiah | G06F 1/1681 |
| 2021/0365069 A1* | 11/2021 | Wen | G06F 1/1616 |
| 2022/0004228 A1* | 1/2022 | Kim | G06F 1/1616 |
| 2022/0129036 A1* | 4/2022 | Wen | G06F 1/1637 |
| 2023/0105445 A1* | 4/2023 | Ha | H10K 59/87 361/807 |

* cited by examiner

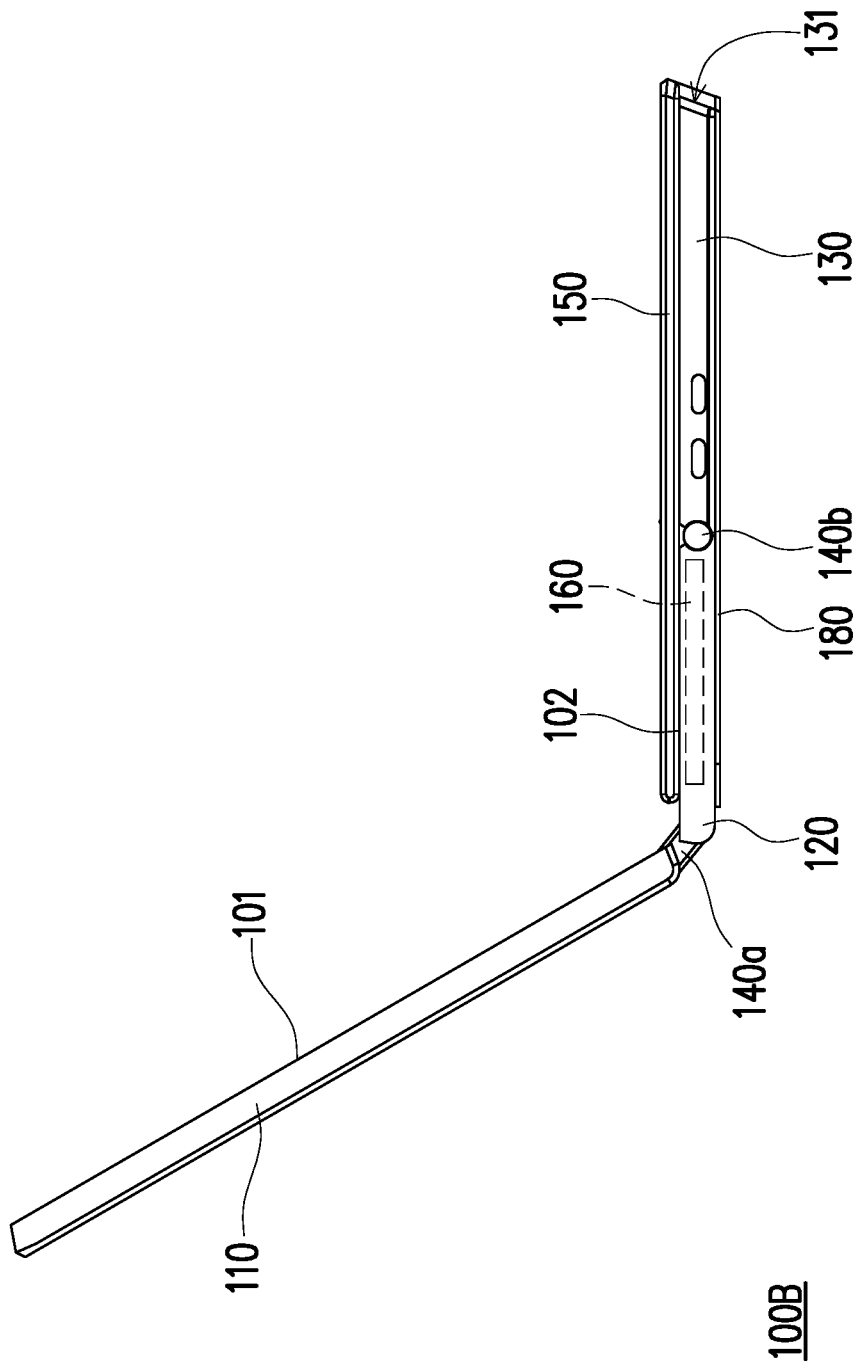

PORTABLE ELECTRONIC DEVICE

CROSS-REFERENCE TO RELATED APPLICATION

This application claims the priority benefit of U.S. provisional application Ser. No. 63/184,802, filed on May 6, 2021. The entirety of the above-mentioned patent application is hereby incorporated by reference herein and made a part of specification.

BACKGROUND OF THE INVENTION

Field of the Invention

The invention relates to an electronic device, and more particularly to a portable electronic device.

Description of Related Art

Due to advantages such as portability, multitasking, and high computing performance, notebook computers have become an indispensable tool for modern people in life or work. However, a common notebook computer adopts a single-screen configuration, or the size of the screen is fixed and may not be adjusted according to the user's operation requirements, thus lacking flexibility in operation. Moreover, most of the cooling modules and speakers are mounted inside the host, thus causing issues such as insufficient cooling space and difficulty in significantly improving sound performance. Thus, the performance of the notebook computer and the user's operating experience are affected.

SUMMARY OF THE INVENTION

The invention provides a portable electronic device having excellent operation flexibility and improving the user's operating experience.

The invention provides a portable electronic device including a first body, a first hinge, a second body, a second hinge, a third body, and an input module. The second body is pivotally connected to the first body via the first hinge. The third body is pivotally connected to the second body via the second hinge, and the second body is located between the first body and the third body. The input module is slidably disposed on the third body and covers the second body. As the input module is slid away from the second hinge, the second body is moved out of the input module.

In an embodiment of the invention, the input module includes a keyboard, a touch panel, or a touch display.

In an embodiment of the invention, when the input module is slid close to the first hinge, the input module covers the second body, the second hinge, and the third body. When the input module is slid away from the first hinge, the input module exposes the second body and the second hinge and covers the third body.

In an embodiment of the invention, when the input module is slid close to the first hinge, the first body is adapted to be unfolded or closed at the second body via the first hinge. When the input module is slid away from the first hinge, the first body is adapted to be unfolded or closed to the second body via the first hinge, and the second body is adapted to be unfolded or closed to the third body via the second hinge.

In an embodiment of the invention, the portable electronic device further includes a speaker disposed in the input module.

In an embodiment of the invention, when the input module is slid close to the first hinge, the speaker is accommodated in the third body. When the input module is slid away from the first hinge, the speaker is moved out of the third body.

In an embodiment of the invention, the portable electronic device further includes a heat dissipation module disposed in the third body, and the third body has an air outlet on a side away from the second hinge.

In an embodiment of the invention, when the input module is slid close to the first hinge, the input module covers the air outlet. When the input module is slid away from the first hinge, the input module exposes the air outlet.

In an embodiment of the invention, the portable electronic device further includes a bottom plate disposed at a bottom of the third body.

In an embodiment of the invention, a width of the third body is less than a width of the bottom plate, and the width of the bottom plate is less than a sum of a width of the second body and the width of the third body.

In an embodiment of the invention, when the input module is slid close to the first hinge, the second body is closed at the bottom plate. When the input module is slid away from the first hinge, the second body is adapted to be unfolded or closed at the bottom plate via the second hinge.

In an embodiment of the invention, the portable electronic device further includes a camera disposed on the first body, and the first hinge is disposed between the camera and the second hinge.

In an embodiment of the invention, when the input module is slid close to the first hinge, the camera and the first body are adapted to adjust a shooting angle and a shooting height via the first hinge. When the input module is slid away from the first hinge, the camera, the first body, and the second body are adapted to adjust the shooting angle and the shooting height via the first hinge and the second hinge.

In an embodiment of the invention, the portable electronic device further includes a functional member disposed on the second body.

In an embodiment of the invention, the functional member includes a camera, a microphone, a speaker, or a display.

In an embodiment of the invention, the portable electronic device further includes a sensor disposed in the second body or the input module configured to sense whether the input module covers the second body.

In an embodiment of the invention, the sensor includes a touch sensor or a proximity sensor.

In an embodiment of the invention, when the input module is slid close to the first hinge, the sensor senses that the input module covers the second body, and the display is in a dormant or disabled state. When the input module is slid away from the first hinge, the sensor senses that the input module exposes the second body, and the display is in a wake-up or enabled state.

In an embodiment of the invention, the display is a flexible display disposed on the first body and the second body and covering the first hinge.

In an embodiment of the invention, the flexible display has a first display area and a second display area, respectively corresponding to the first body and the second body.

In an embodiment of the invention, when the input module is slid close to the first hinge, the first display area and the first body are adapted to adjust an angle via the first hinge. When the input module is slid away from the first hinge, the first display area, the first body, the second display area, and the second body are adapted to adjust the angle and a height via the first hinge and the second hinge.

In an embodiment of the invention, a length of the first display area is equal to a length of the second display area, and a width of the first display area is greater than a width of the second display area.

In an embodiment of the invention, the portable electronic device further includes a first sensor and a second sensor. The first sensor is disposed in the first body. The second sensor is disposed in the second body. The first sensor and the second sensor are configured to sense an included angle between the first body and the second body.

In an embodiment of the invention, the first sensor and second sensor include a gyroscope, a gravity sensor, or a magnetometer.

In an embodiment of the invention, when a display ratio of a display content of the display is equal to a display ratio of the first display area plus the second display area, and when the included angle between the first body and the second body is less than 180 degrees, the functional member prompts a user to adjust the included angle to 180 degrees.

In an embodiment of the invention, when a display ratio of a display content of the display is equal to a display ratio of the first display area, and the included angle between the first body and the second body is equal to 180 degrees, the functional member prompts a user to adjust the included angle to less than 180 degrees.

In an embodiment of the invention, when the included angle between the first body and the second body is less than 180 degrees, the first display area and the second display area are adapted to switch between a first display mode, a second display mode, and a third display mode. In the first display mode, the first display area displays a first screen, and the second display area displays a second screen. In the second display mode, the first display area displays the second screen, and the second display area displays the first screen. In the third display mode, the first display area displays a third screen, and the second display area displays the first screen.

In an embodiment of the invention, when the included angle between the first body and the second body is equal to 180 degrees, the first display area and the second display area are switched to a fourth display mode and display a fourth screen.

Based on the above, in the portable electronic device of the invention, the user may slide the input module according to the operation requirements, so that the second body is covered by the input module or removed from the input module to flexibly switch the operation mode, thus achieving excellent operation flexibility. Further, when the second body is covered by the input module, the angle of the first body may be adjusted. After the second body is moved out of the input module, the angle of the second body may be adjusted, while the angle and height of the first body may be adjusted synchronously with the rotation of the second body. Alternatively, the angle of the first body may be adjusted independently, and therefore the portable electronic device of the invention not only improves the operating comfort, but also improves the user's operating experience.

In order to make the aforementioned features and advantages of the disclosure more comprehensible, embodiments accompanied with figures are described in detail below.

BRIEF DESCRIPTION OF THE DRAWINGS

FIG. 3A and FIG. 3B are schematic side views of a portable electronic device in a first state and a second state, respectively, of another embodiment of the invention.

DESCRIPTION OF THE EMBODIMENTS

Figure 1A:
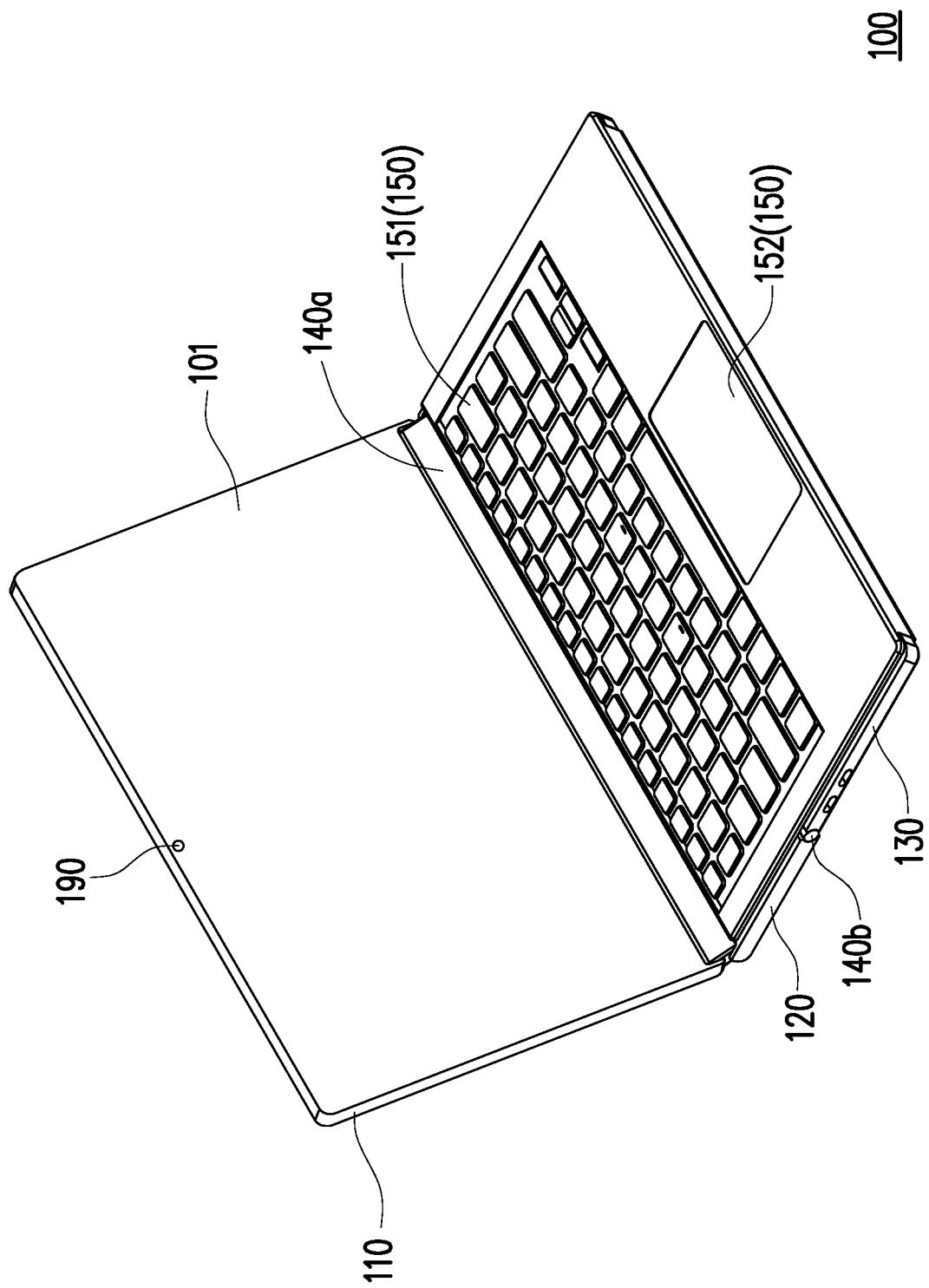
FIG. 1A and FIG. 1B are schematic diagrams of a portable electronic device in a first state and a second state, respectively, of an embodiment of the invention.
Figure 1B:
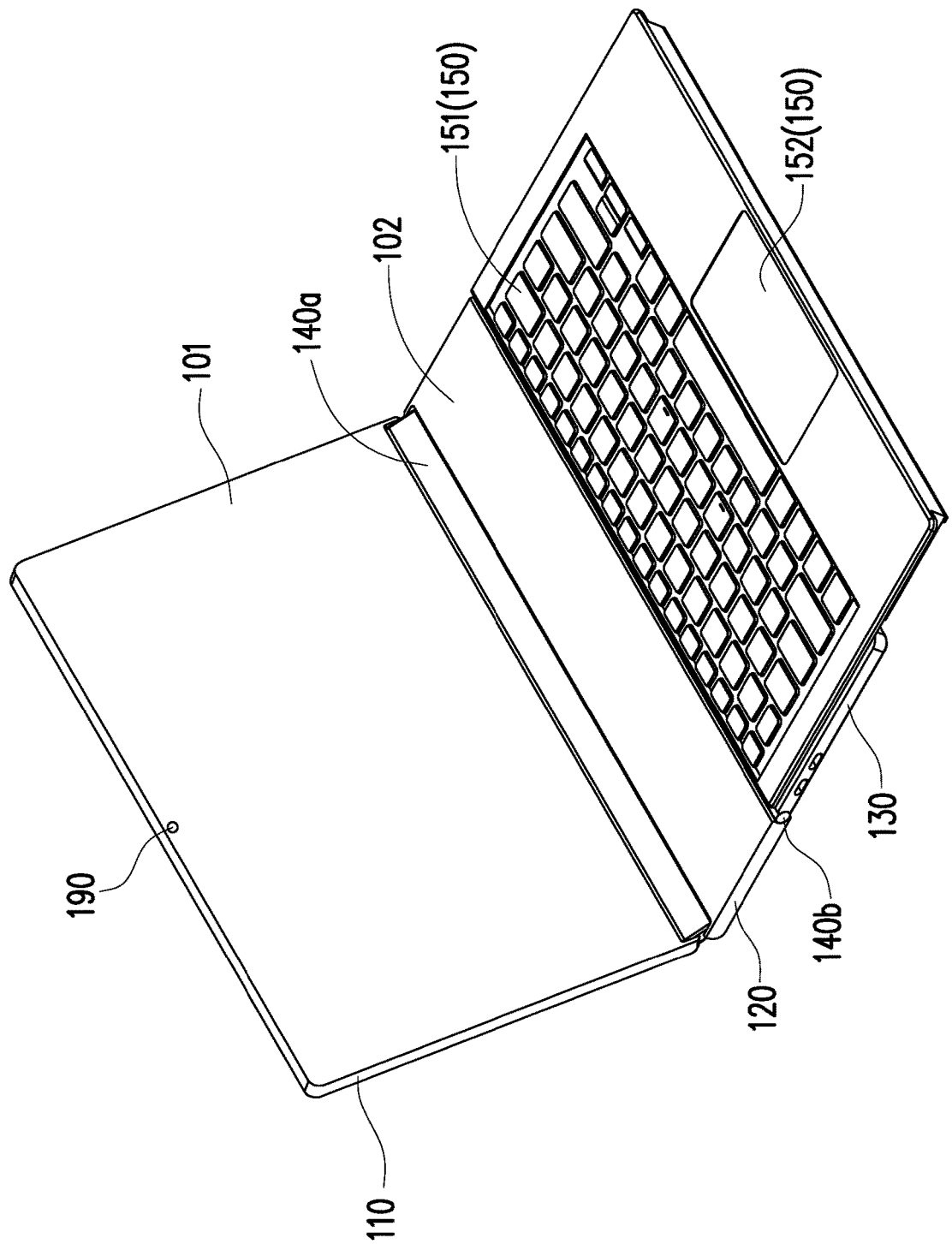
Figure 1C:
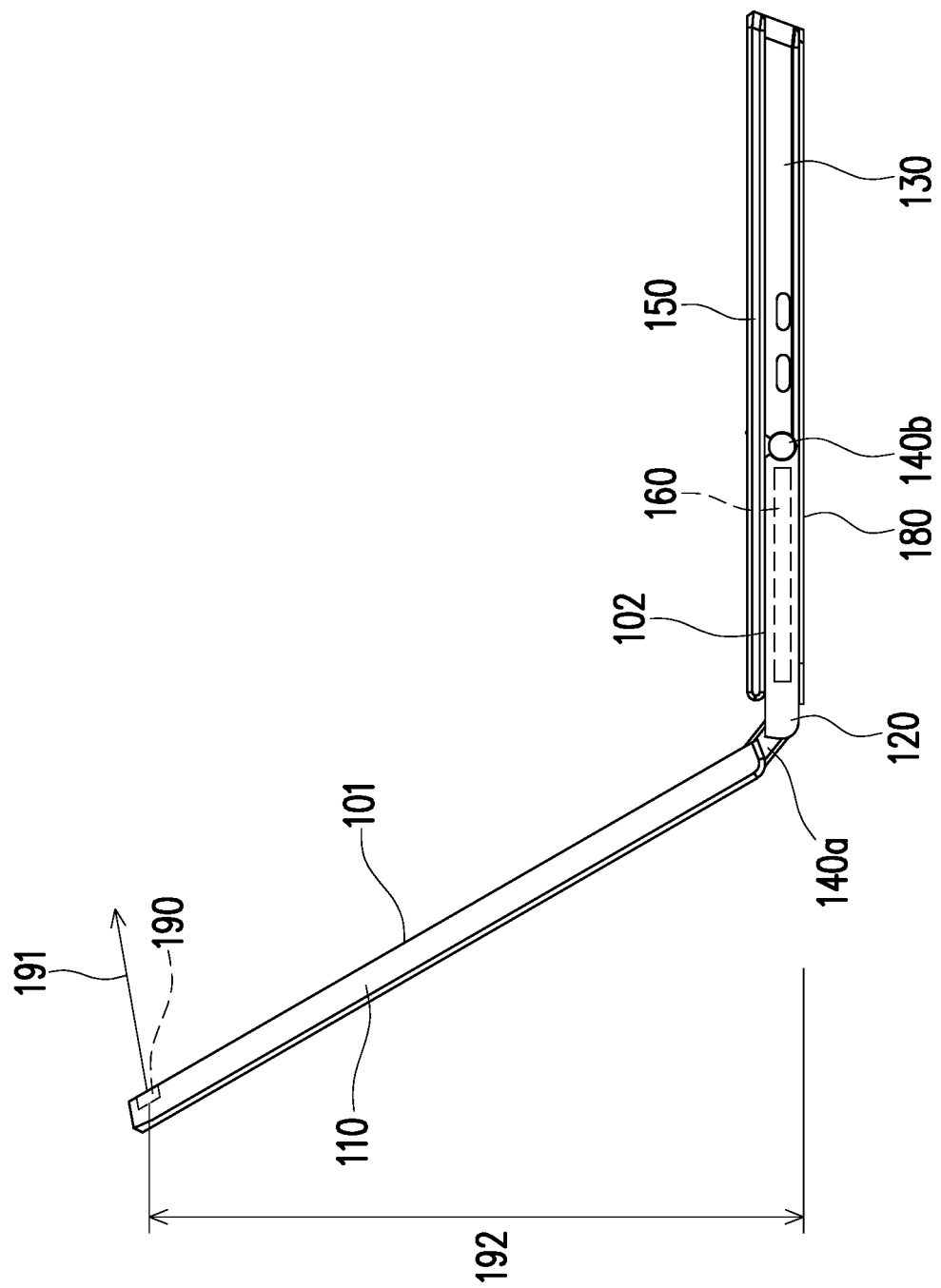
FIG. 1C and FIG. 1D are schematic side views of the portable electronic device of FIG. 1A and FIG. 1B, respectively.
Figure 1D:
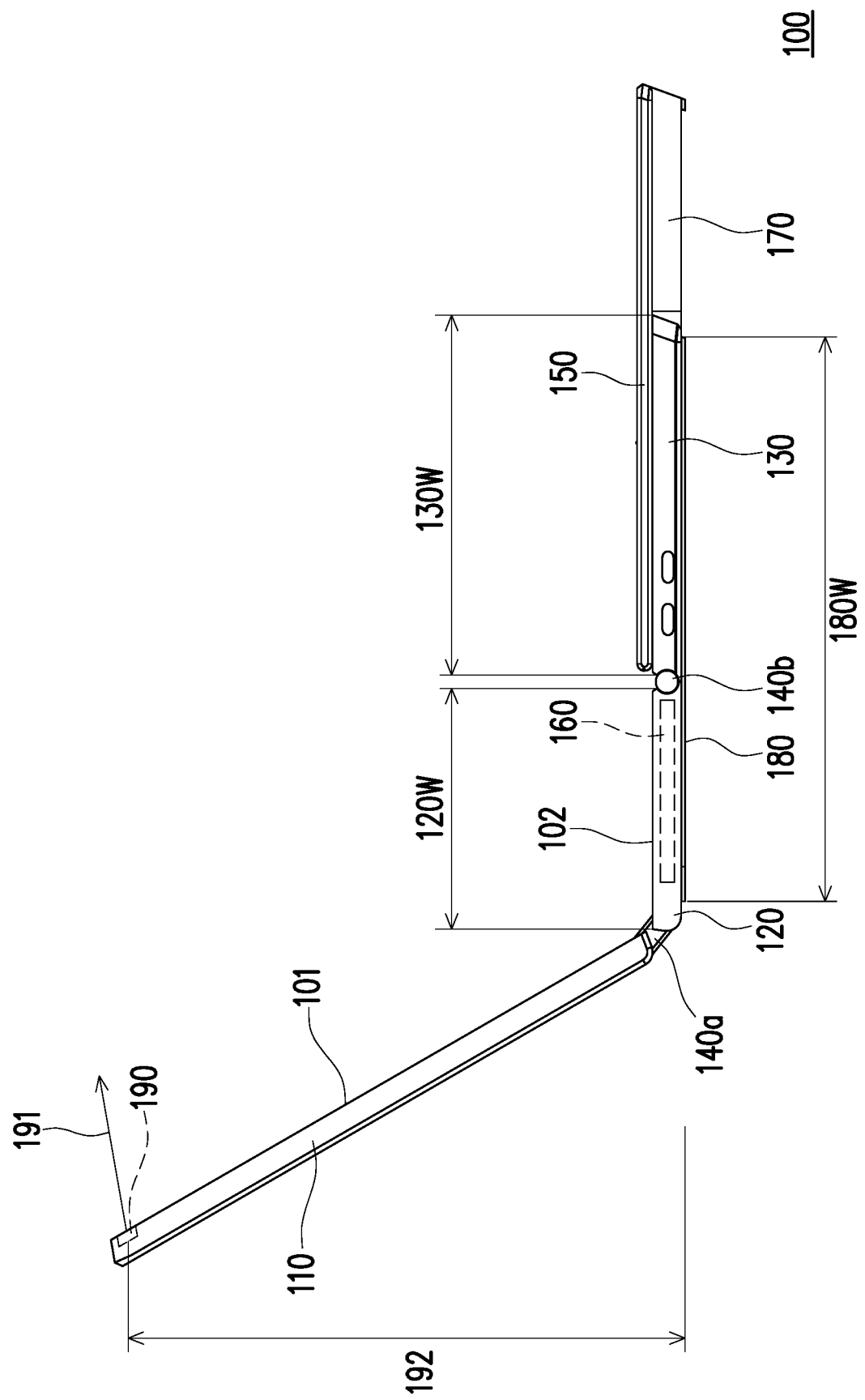

FIG. 1A and FIG. 1B are schematic diagrams of a portable electronic device in a first state and a second state, respectively, of an embodiment of the invention. FIG. 1C and FIG. 1D are schematic side views of the portable electronic device of FIG. 1A and FIG. 1B, respectively. Referring to FIG. 1A to FIG. 1D, in the present embodiment, a portable electronic device 100 may be a notebook computer, and includes a first body 110, a second body 120, a third body 130, a first hinge 140a, a second hinge 140b, and an input module 150. The second body 120 is disposed between the first body 110 and the third body 130, wherein the second body 120 is pivotally connected to the first body 110 via the first hinge 140a, and the third body 130 is pivotally connected to the second body 120 via the second hinge 140b. That is, the first body 110 is adapted to be rotated relative to the second body 120 via the first hinge 140a, and the second body 120 is adapted to be rotated relative to the third body 130 via the second hinge 140b.

As shown in FIG. 1A and FIG. 1C, the input module 150 is slidably disposed on the third body 130 and covers the second body 120 and the second hinge 140b. When the second body 120 and the second hinge 140b are covered by the input module 150, the second body 120 temporarily may not be rotated relative to the third body 130 via the second hinge 140b. In the state shown in FIG. 1A and FIG. 1C, the first body 110 may be rotated relative to the second body 120 via the first hinge 140a to adjust the angle thereof (e.g., viewing angle).

In the present embodiment, the input module 150 includes a keyboard 151 and a touch pad 152, and the keyboard 151 is located between the first hinge 140a and the touch pad 152. In other embodiments, the input module may include any one of a keyboard, a touch panel, and a touch display, or a combination of at least two of the above.

As shown in FIG. 1A and FIG. 1C, when the input module 150 is slid close to the first hinge 140a, the input module 150 covers the second body 120, the second hinge 140b, and the third body 130, and therefore the second body 120 temporarily may not be rotated relative to the third body 130 via the second hinge 140b. Moreover, the first body 110 may be rotated relative to the second body 120 via the first hinge 140a to adjust the angle thereof (e.g., viewing angle). That is, the first body 110 is adapted to be unfolded or closed to the second body 120 via the first hinge 140a.

As shown in FIG. 1B and FIG. 1D, when the input module 150 is slid away from the first hinge 140a, the second body 120 and the second hinge 140b are moved out of the input module 150 to be exposed to the outside, but the third body 130 is still covered by the input module 150. After the second body 120 and the second hinge 140b are moved out of the input module 150 without being covered by the input module 150, the second body 120 may be rotated relative to the third body 130 via the second hinge 140b to adjust the angle thereof (e.g., viewing angle). Moreover, the angle (e.g., viewing angle) and height (e.g., viewing height) of the first body 110 may be adjusted synchronously with the rotation of the second body 120, or the angle (e.g., viewing angle) of the first body 110 may be adjusted independently. That is, the first body 110 is adapted to be unfolded or closed to the second body 120 via the first hinge 140a, and the second body 120 is adapted to be unfolded or closed to the third body 130 via the second hinge 140b.

As shown in FIG. 1A and FIG. 1B, the first body 110 has a first display area 101, and the second body 120 has a second display area 102. The first display area 101 and the second display area 102 are separated from each other, and the first hinge 140a is located between the first display area 101 and the second display area 102. In detail, the first display area 101 and the second display area 102 form at least a portion of the display, wherein the first display area 101 may be used as a main display area, and the second display area 102 may be used as an auxiliary display area.

As shown in FIG. 1A and FIG. 1C, when the input module 150 is slid close to the first hinge 140a, the input module 150 covers the second display area 102, and the user may view the screen displayed on the first display area 101 of the first body 110. At this time, the angle of the first body 110 is adjustable to adjust the viewing angle of the first display area 101.

As shown in FIG. 1B and FIG. 1D, when the input module 150 is slid away from the first hinge 140a, the second body 120 is moved out of the input module 150 so that the second display area 102 of the second body 120 is not covered by the input module 150 and is exposed to the outside. Therefore, the user may view the screen displayed in the first display area 101 and the screen displayed in the second display area 102 at the same time. At this time, the angle of the second body 120 is adjustable to adjust the viewing angle of the second display area 102, and, the angle and height of the first body 110 may be adjusted synchronously with the rotation of the second body 120, so as to adjust the viewing angle and viewing height of the first display area 101, or, the angle of the first body 110 may be adjusted independently to adjust the viewing angle of the first display area 101.

Therefore, the user may slide the input module 150 according to operation requirements to increase or decrease the number of display areas or scale the size of the display areas, thus achieving excellent operation flexibility. Moreover, since the viewing angle and viewing height of the first display area 101 are adjustable, and the viewing angle of the second display area 102 is adjustable, not only are the flexibility and comfort of operation improved, the user's operating experience is also improved.

For example, the second body 120 may be entirely or partially moved out of the input module 150 as the input module 150 is slid away from the second hinge 140b. When the second body 120 is partially moved out of the input module 150, the first display area 101 may be used as a main display area, and a part of the second display area 102 located outside of the input module 150 may be used as an auxiliary display area.

Referring to FIG. 1C and FIG. 1D, in the present embodiment, the portable electronic device 100 further includes a sensor 160 disposed in the second body 120 and configured to sense whether the input module 150 covers the second body 120. As shown in FIG. 1A and FIG. 1C, when the input module 150 is slid close to the first hinge 140a, the sensor 160 senses that the input module 150 covers the second body 120 and the second display area 102 is in a sleep state or a disabled state. As shown in FIG. 1B and FIG. 1D, when the input module 150 is slid away from the first hinge 140a, the sensor 160 senses that the second body 120 is moved out of the input module 150 and exposed to the outside, and the second display area 102 is awakened from the sleep state and switched to a wake-up or enabled state.

For example, the sensor 160 may be a touch sensor or a proximity sensor, wherein the sensing mechanism of the touch sensor is based on whether the input module 150 is in contact with the second body 120. In addition, the sensing mechanism of the proximity sensor is based on changes in light, capacitance, inductance, magnetic field, or the like caused by the sliding of the input module 150. In other embodiments, the sensor may be disposed in the input module, or both the second body and the input module may be provided with a sensor.

As shown in FIG. 1C and FIG. 1D, in the present embodiment, the portable electronic device 100 further includes a speaker 170, wherein the speaker 170 is disposed in the input module 150 to slide close to the first hinge 140a or slide away from the first hinge 140a along with the input module 150. When the input module 150 is slid close to the first hinge 140a, the speaker 170 is accommodated in the first body 110. When the input module 150 is slid away from the first hinge 140a, the speaker 170 is moved out of the third body 130, in order to avoid the degradation of the sound performance of the speaker 170 due to the interference of the casing of the third body 130 or the components in the casing, thus improving the user's operating experience.

Figure 1E:
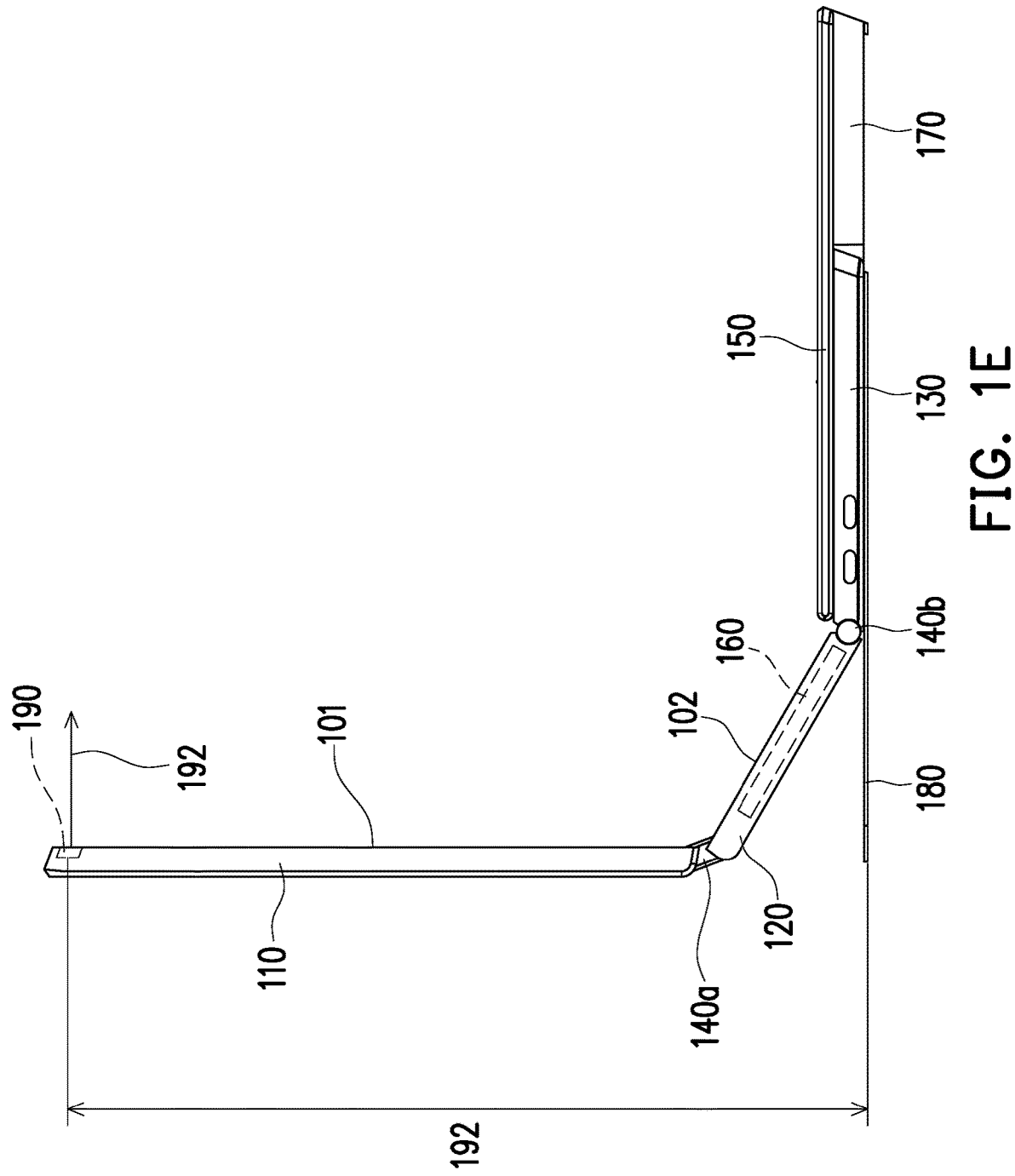
FIG. 1E is a schematic side view of the portable electronic device of FIG. 1D converted to a third state.
Figure 1F:
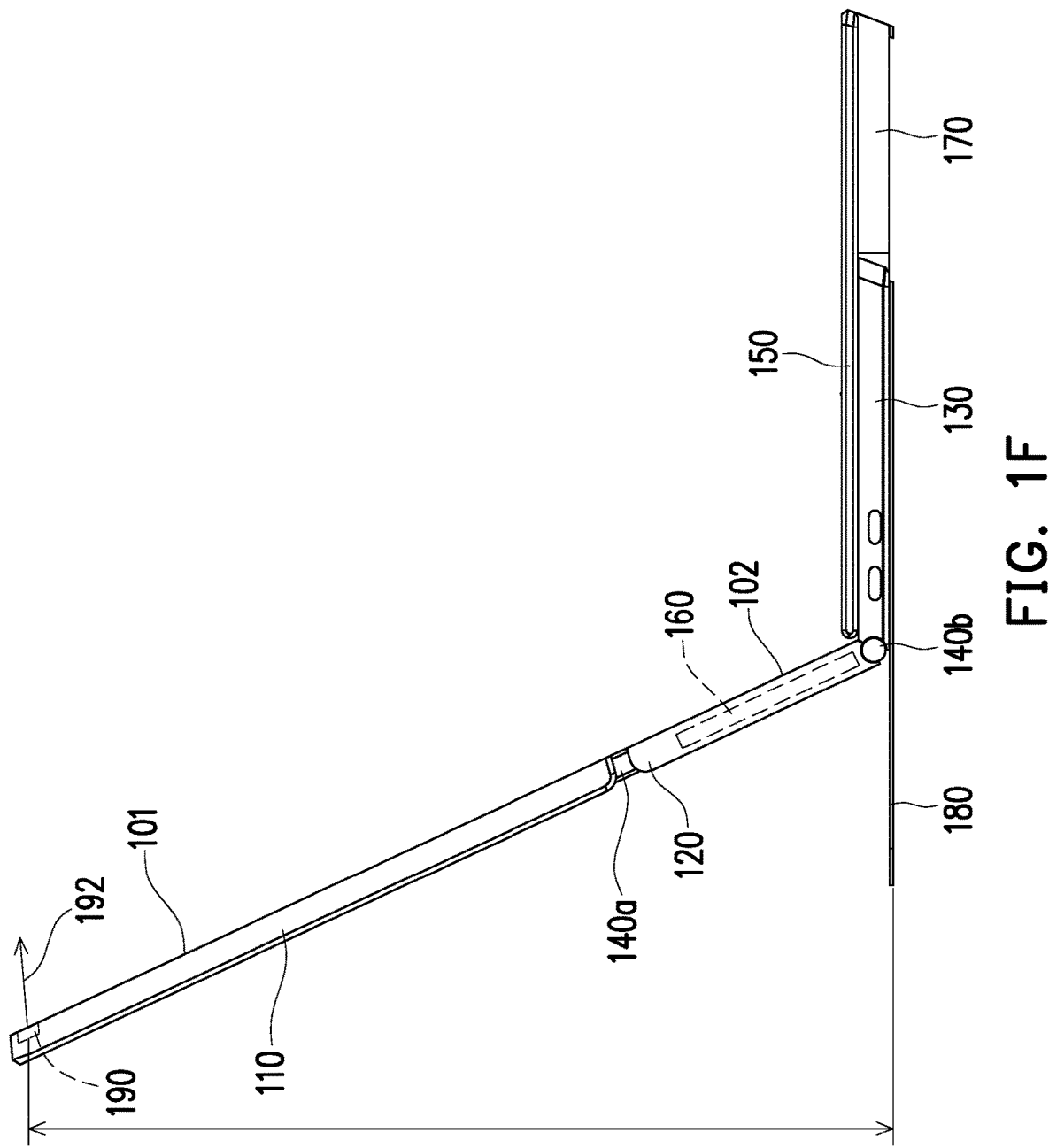
FIG. 1F is a schematic side view of the portable electronic device of FIG. 1E converted to a fourth state.

FIG. 1E is a schematic side view of the portable electronic device of FIG. 1D converted to a third state. FIG. 1F is a schematic side view of the portable electronic device of FIG. 1E converted to a fourth state. Referring to FIG. 1D to FIG. 1F, when the input module 150 is slid away from the first hinge 140a, the second body 120 is moved out of the input module 150 so that the second display area 102 of the second body 120 is not covered by the input module 150 and is exposed to the outside. Therefore, the user may view the screen displayed in the first display area 101 and the screen displayed in the second display area 102 at the same time. At this time, the angle of the second body 120 is adjustable to adjust the viewing angle of the second display area 102, and, the angle and height of the first body 110 may be adjusted synchronously with the rotation of the second body 120, so as to adjust the viewing angle and viewing height of the first display area 101, or, the angle of the first body 110 may be adjusted independently to adjust the viewing angle of the first display area 101.

In the present embodiment, the portable electronic device 100 further includes a bottom plate 180 disposed at the bottom of the third body 130, and the second body 120 and the third body 130 are disposed on the bottom plate 180. As shown in FIG. 1C to FIG. 1E, when the input module 150 is slid close to the first hinge 140a, the second body 120 is closed at the bottom plate 180. On the contrary, when the input module 150 is slid away from the first hinge 140a, the second body 120 is adapted to be unfolded or closed at the bottom plate 180 via the second hinge 140b. As shown in FIG. 1E and FIG. 1F, after the first body 110 and the second body 120 are rotated and lifted relative to the third body 130, the bottom plate 180 and the third body 130 may stably support the first body 110 and the second body 120 to prevent the portable electronic device 100 from shaking or falling.

As shown in FIG. 1D, a width 130W of the third body 130 is less than a width 180W of the bottom plate 180, and the width 180W of the bottom plate 180 is less than the sum of a width 120W of the second body 120 and the width 130W of the third body 130.

As shown in FIG. 1C, the portable electronic device 100 further includes a camera 190 disposed on the first body 110, and the first hinge 140a is disposed between the camera 190 and the second hinge 140b. When the input module 150 is slid close to the first hinge 140a, the camera 190 and the first body 110 are adapted to adjust a shooting angle 191 and a shooting height 192 via the first hinge 140a. That is to say, the shooting angle 191 and the shooting height 192 of the camera 190 may be adjusted according to the rotation of the first body 110.

As shown in FIG. 1D to FIG. 1F, when the input module 150 is slid away from the first hinge 140a, the camera 190, the first body 110, and the second body 120 are adapted to adjust the shooting angle 191 and the shooting height 192 via the first hinge 140a and the second hinge 140b. That is to say, the shooting angle 191 and the shooting height 192 of the camera 190 may be adjusted according to the rotation of the first body 110 or the second body 120.

Figure 2:
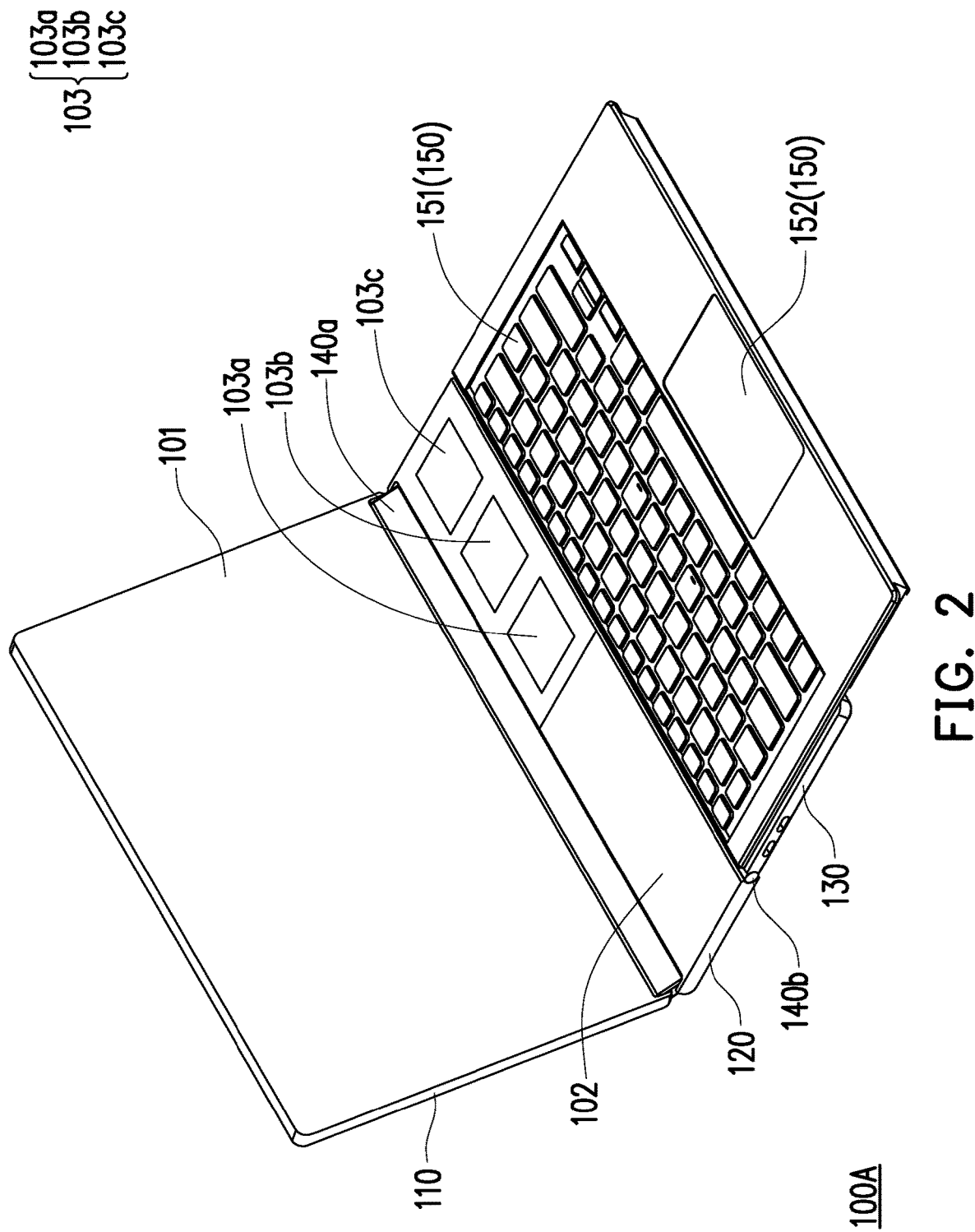
FIG. 2 is a schematic diagram of a portable electronic device of another embodiment of the invention.

FIG. 2 is a schematic diagram of a portable electronic device of another embodiment of the invention. Referring to FIG. 2, unlike the portable electronic device 100 shown in FIG. 1B, a portable electronic device 100A of the present embodiment further includes a functional member 103, wherein the functional member 103 is disposed on the second body 120 and includes a camera 103a, a microphone 103b, and a speaker 103c. For example, the second display area 102 may be a portion of the functional member 103, and the camera 103a, the microphone 103b, and the speaker 103c are located on the same side of the second display area 102. When the input module 150 is slid away from the first hinge 140a, the second display area 102, the camera 103a, the microphone 103b, and the speaker 103c are not covered by the input module 150 and are exposed to the outside. Conversely, when the input module 150 is slid close to the first hinge 140a, the second display area 102, the camera 103a, the microphone 103b, and the speaker 103c are covered by the input module 150. Moreover, the type or quantity of the functional member 103 may be adjusted according to design requirements.

Figure 3B:
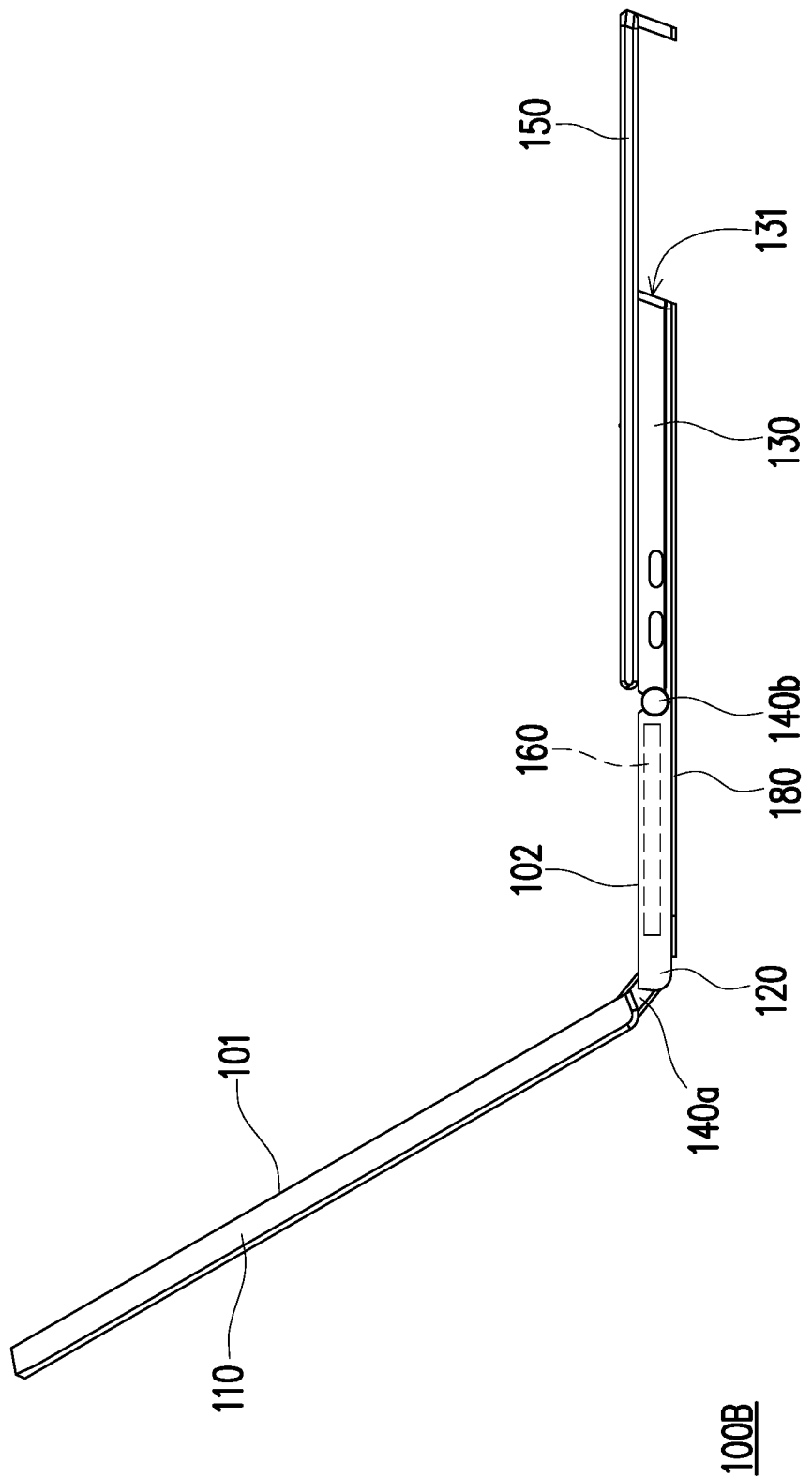

FIG. 3A and FIG. 3B are schematic side views of a portable electronic device in a first state and a second state, respectively, of another embodiment of the invention. Please refer to FIG. 3A and FIG. 3B. Unlike the portable electronic device 100 shown in FIG. 1C and FIG. 1D, a portable electronic device 100B of the present embodiment further includes a heat dissipation module 104 disposed in the third body 130, and the third body 130 has an air outlet 131 on a side away from the first hinge 140a. When the input module 150 is slid close to the first hinge 140a, the input module 150 covers the air outlet 131. On the contrary, when the input module 150 is slid away from the first hinge 140a, the air outlet 131 is not covered by the input module 150 and is exposed to the outside. As shown in FIG. 3B, the air outlet 131 not covered by the input module 150 and exposed to the outside may be used as another heat dissipation path of the heat dissipation module 104 (for example, an exhaust path of hot air), thus not only improving the heat dissipation efficiency of the portable electronic device 100B, but also improving the performance of the portable electronic device 100B.

FIG. 4A to FIG. 4D are schematic side views of a portable electronic device in a first state to a fourth state, respectively, of another embodiment of the invention. Please refer to FIG. 4A to FIG. 4D. Unlike the portable electronic device 100 shown in FIG. 1C to FIG. 1F, in the present embodiment, a portable electronic device 100C includes a flexible display 10 disposed on the first body 110 and the second body 120, wherein the flexible display 10 covers the first hinge 140a and has a first display area 101 corresponding to the first body 110 and a second display area 102 corresponding to the second body 120. Further, the first display area 101 and the second display area 102 are connected to each other, and as the first body 110 is rotated relative to the second body 120, a section in the flexible display 10 corresponding to the first hinge 140a (i.e., the section located in the first display area 101 and the second display area 102) may be bent accordingly.

Figure 4A:
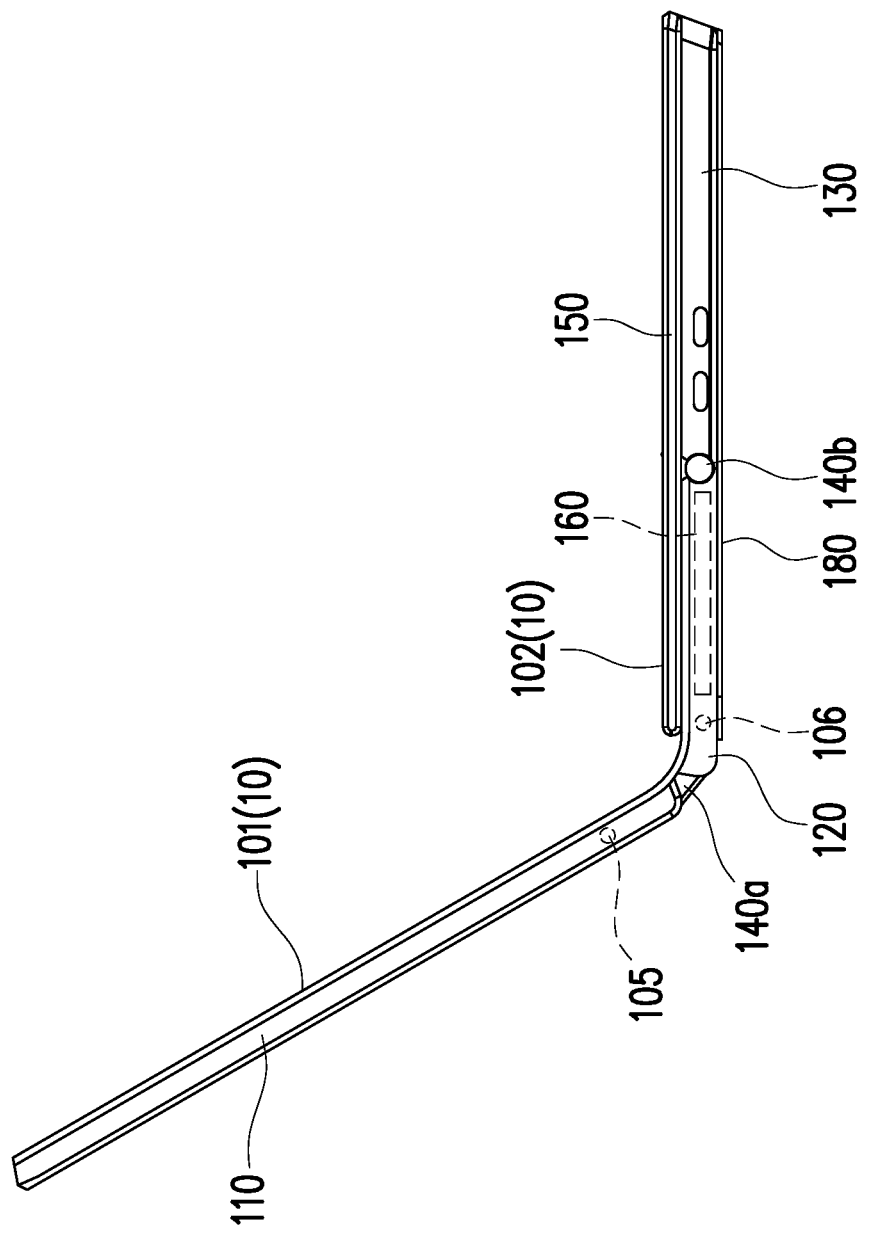
FIG. 4A to FIG. 4D are schematic side views of a portable electronic device in a first state to a fourth state, respectively, of another embodiment of the invention.
Figure 4B:
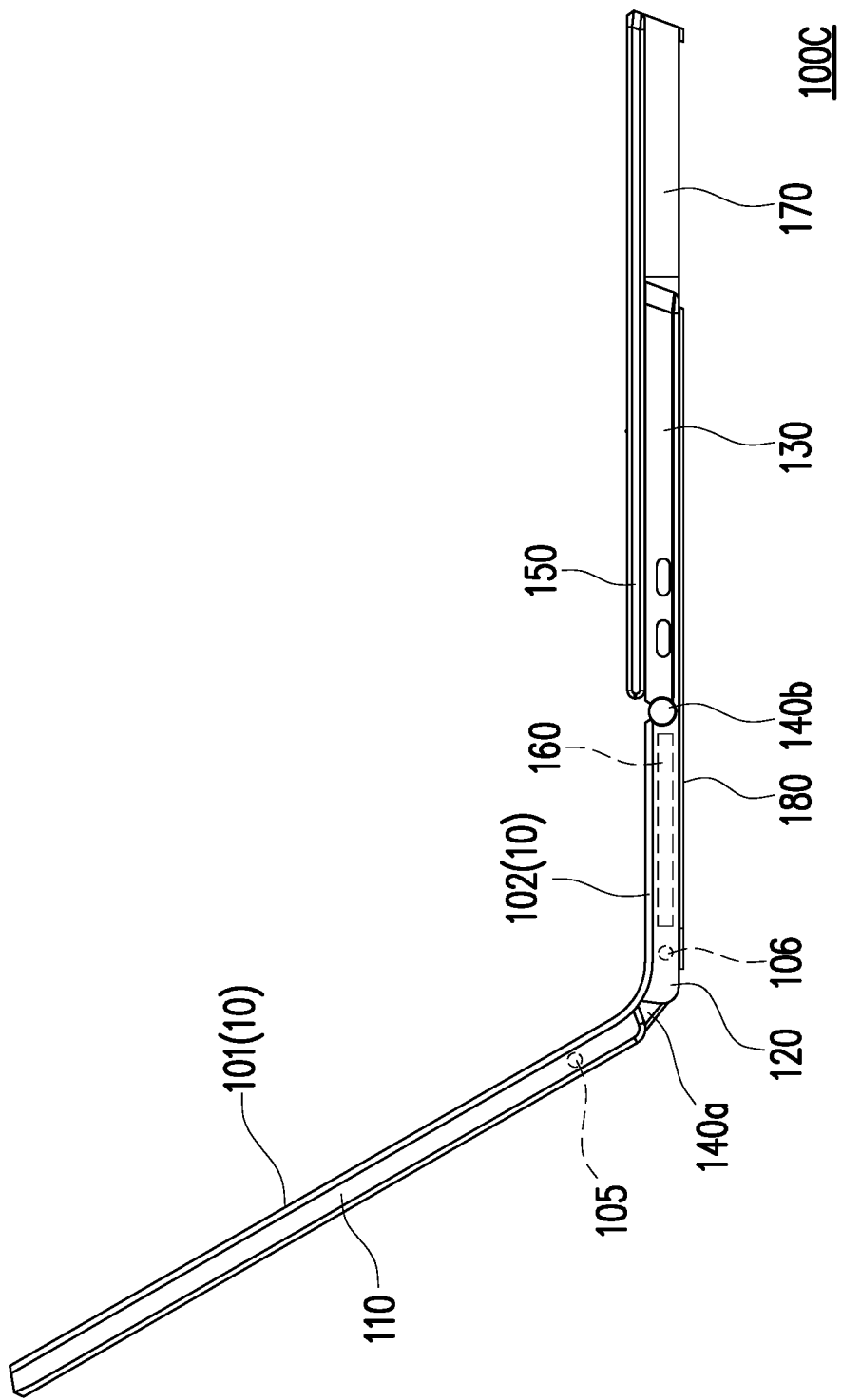
Figure 4C:
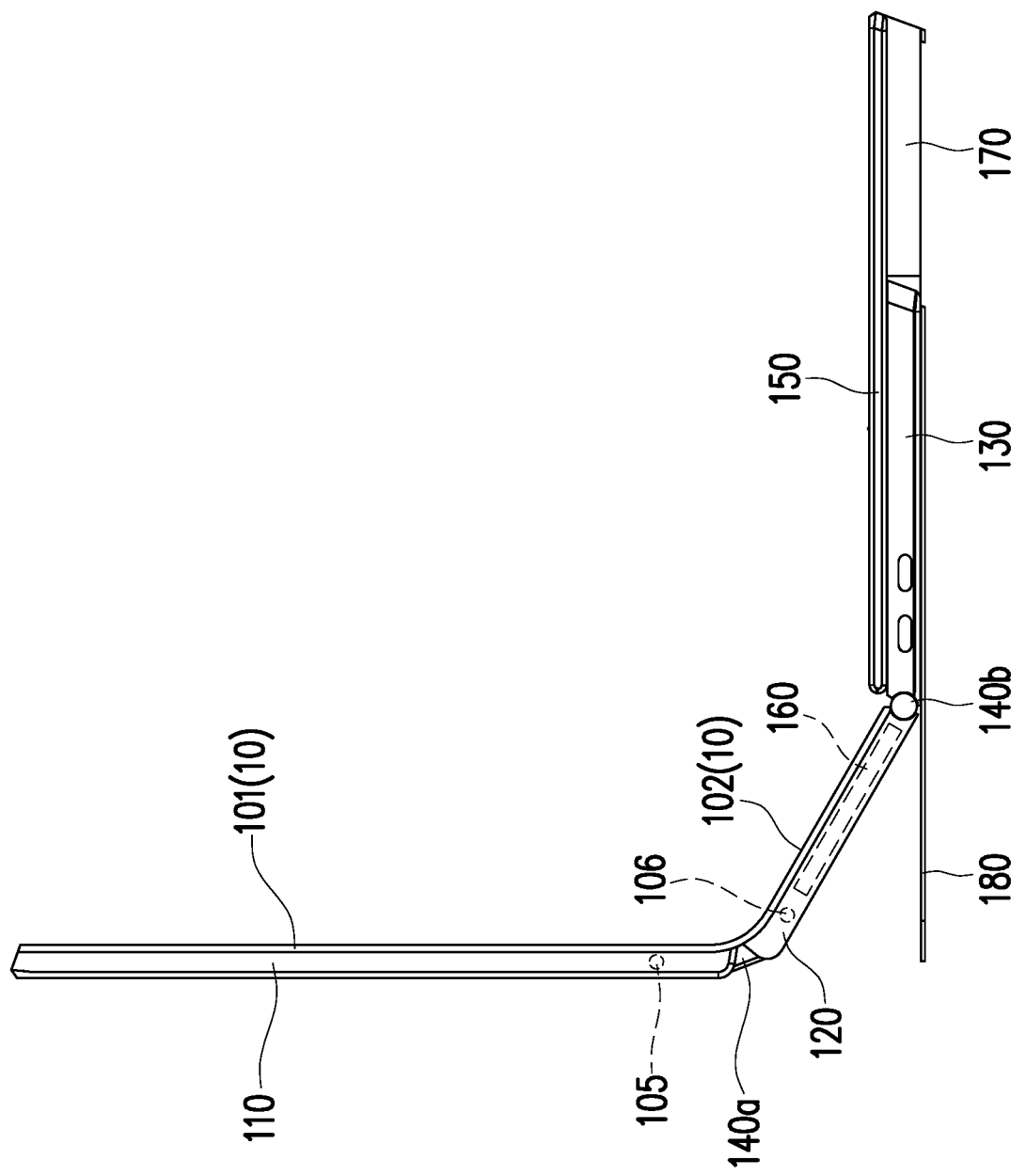
Figure 4D:
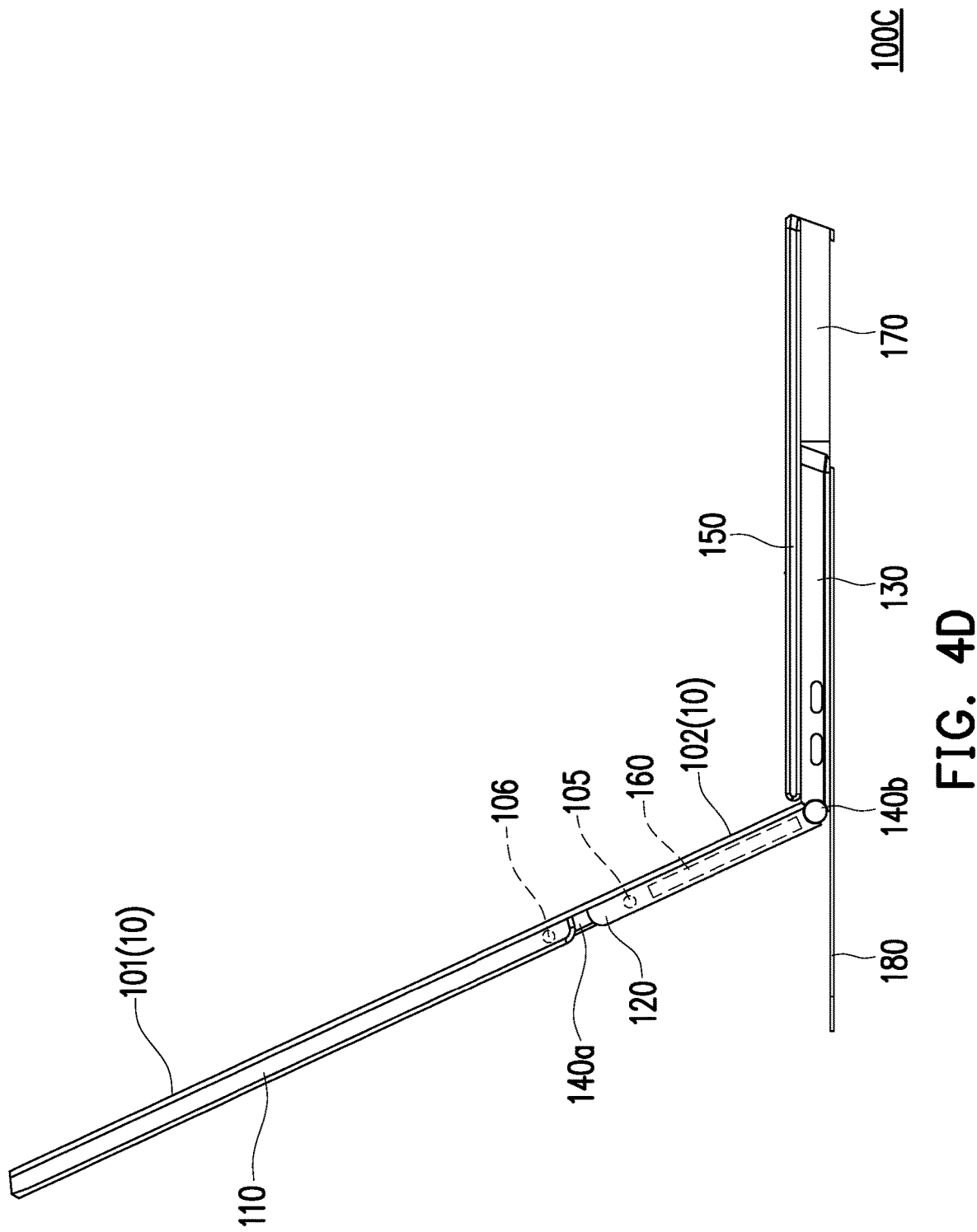

As shown in FIG. 4A and FIG. 4B, when the input module 150 is slid close to the first hinge 140a, the first display area 101 and the first body 110 are adapted to adjust the angle via the first hinge 140a. That is to say, the viewing angle of the first display area 101 may be adjusted with the rotation of the first body 110. As shown in FIG. 4B to FIG. 4D, when the input module 150 is slid away from the first hinge 140a, the first display area 101, the first body 110, the second display area 102, and the second body 120 are adapted to adjust the angle and height via the first hinge 140a and the second hinge 140b. That is, the viewing angle and viewing height of the first display area 101 and the second display area 102 may be adjusted according to the rotation of the first body 110 or the second body 120. As shown in FIG. 4D, the included angle between the first display area 101 and the second display area 102 is equal to 180 degrees, and the flexible display 10 is in a flat state.

Figure 4E:
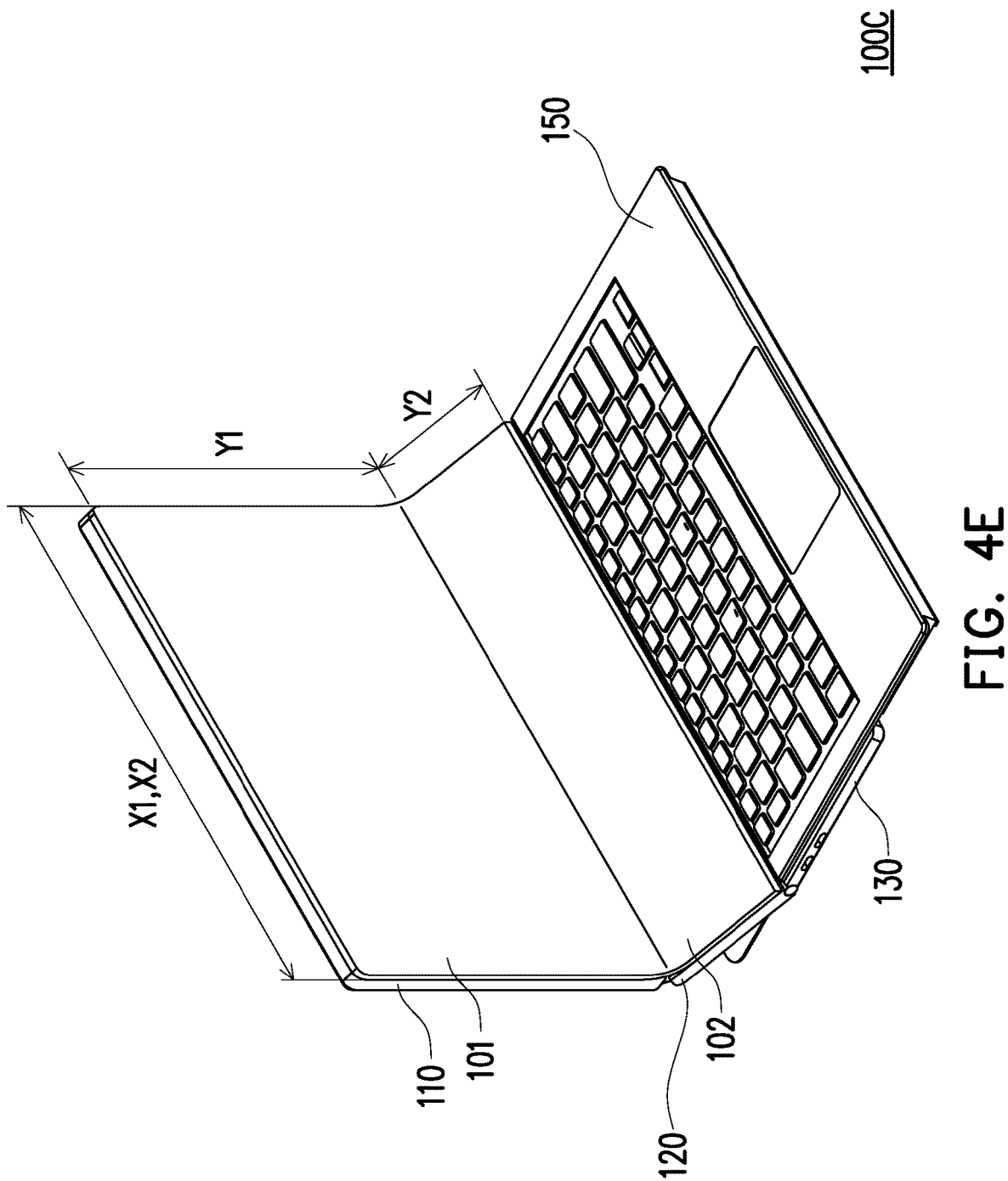
FIG. 4E is a schematic diagram of the portable electronic device of FIG. 4C from another viewing angle.

FIG. 4E is a schematic diagram of the portable electronic device of FIG. 4C from another viewing angle. Referring to FIG. 4E, a length X1 of the first display area 101 is equal to a length X2 of the second display area 102, and a width Y1 of the first display area 101 is greater than a width Y2 of the second display area 102. In an embodiment, the ratio of the length X1 to the width Y1 of the first display area 101 is 16:9, and the ratio of the length X2 to the width Y2 of the second display area 102 is 16:3. In addition, the ratio of the length X1 to the width (Y1+Y2) of the first display area 101 and the second display area 102 is 4:3. In another embodiment, the ratio of the length X1 to the width Y1 of the first display area 101 is 8:5, and the ratio of the length X2 to the width Y2 of the second display area 102 is 8:3. In addition, the ratio of the length X1 to the width (Y1+Y2) of the first display area 101 and the second display area 102 is 1:1.

In the portable electronic device 100 and the portable electronic devices 100A to 100C of the above embodiments, a first sensor and a second sensor configured to sense the included angle between the first body 110 and the second body 120 may be further disposed on the first body 110 and the second body 120, respectively. The following is an example of the portable electronic device 100C.

Referring to FIG. 4B to FIG. 4E, a first sensor 105 is disposed inside the first body 110, and a second sensor 106 is disposed inside the second body 120. The first sensor 105 and the second sensor 106 include a gyroscope, a gravity sensor, or a magnetometer configured to sense the included angle between the first body 110 and the second body 120. As the included angle between the first body 110 and the second body 120 is changed, the first display area 101 and the second display area 102 may be switched between different display modes, or, when the included angle between the first body 110 and the second body 120 remains unchanged, the display modes of the first display area 101 and the second display area 102 are switched based on the operation command.

For example, when the display ratio of the display content of the display is equal to the display ratio of the first display area 101 plus the second display area 102 (for example, 4:3), and when the included angle between the first body 110 and the second body 120 is less than 180 degrees, the functional member prompts the user to adjust the included angle to 180 degrees. In addition, when the display ratio of the display content of the display is equal to the display ratio of the first display area 101 (for example, 16:9), and the included angle between the first body 110 and the second body 120 is equal to 180 degrees, the functional member prompts the user to adjust the included angle to less than 180 degrees. The functional member may be a speaker or a display prompting the user to adjust the included angle between the first body 110 and the second body 120 via sound or video.

Figure 5:
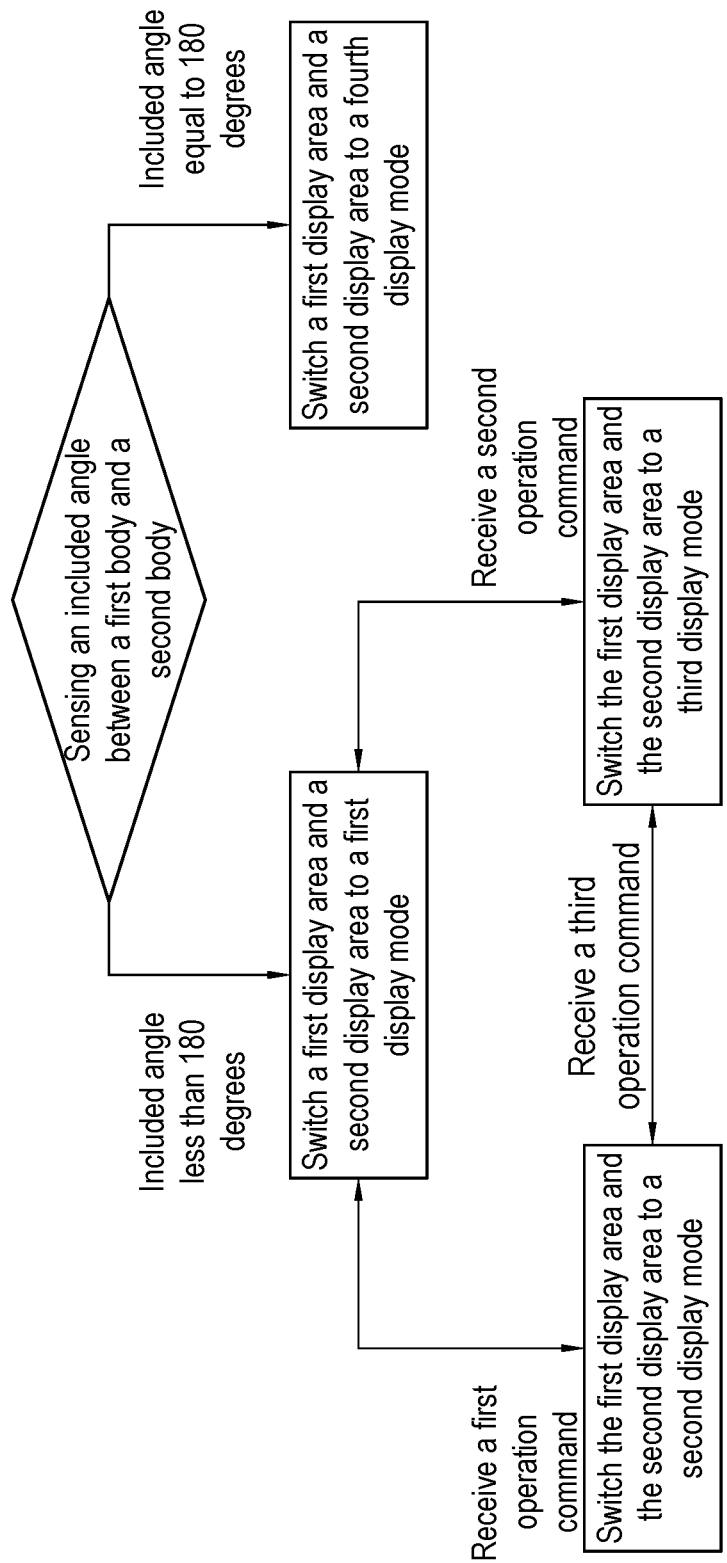
FIG. 5 is a schematic diagram of a control flow of the display modes of a first display area and a second display area.
Figure 6A:
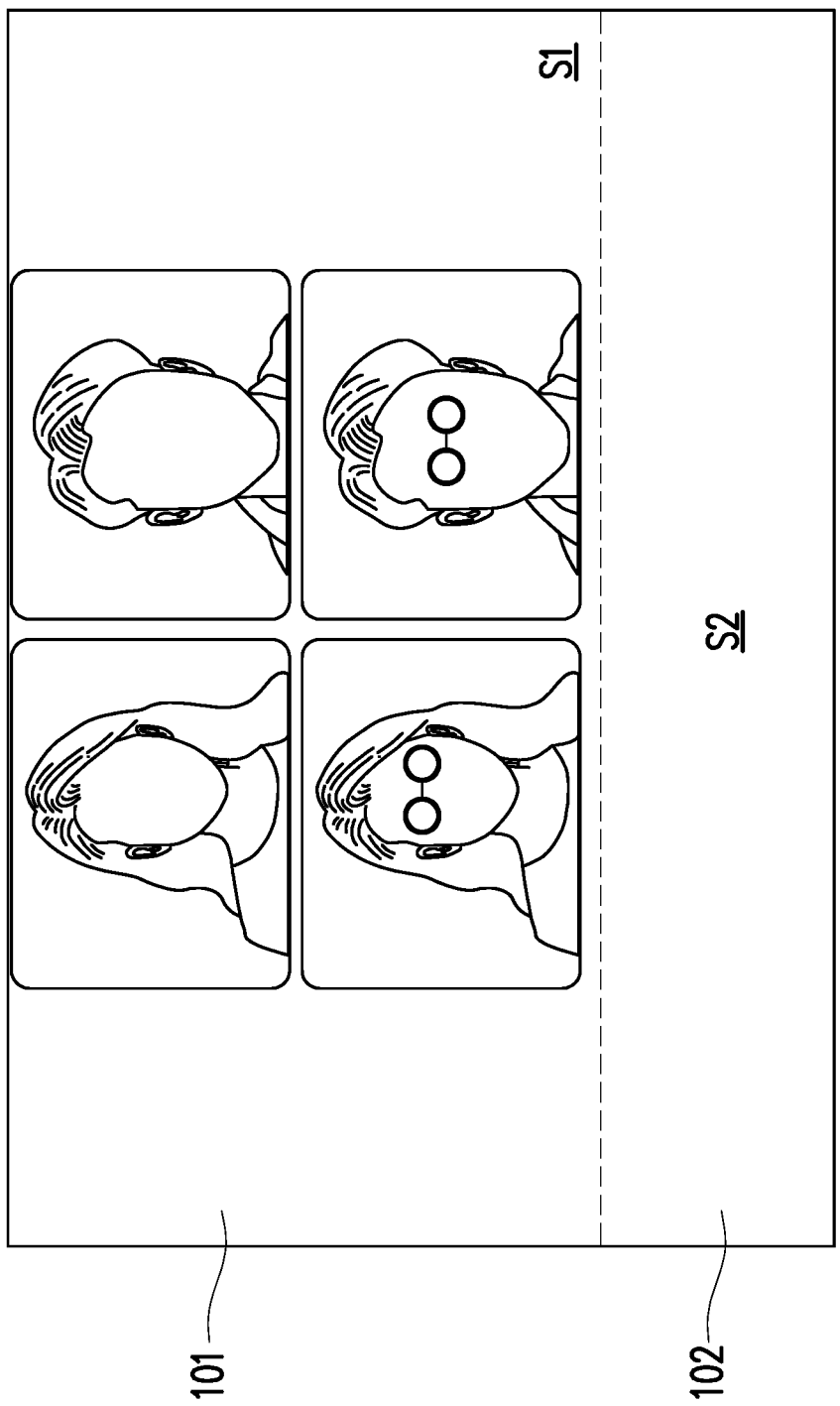
FIG. 6A to FIG. 6D are schematic diagrams of a first display area and a second display area in a first display mode to a fourth display mode, respectively.

FIG. 5 is a schematic diagram of a control flow of the display modes of a first display area and a second display area. FIG. 6A to FIG. 6D are schematic diagrams of a first display area and a second display area in a first display mode to a fourth display mode, respectively. Referring to FIG. 5 and FIG. 6A, when it is sensed that the included angle between the first body 110 and the second body 120 is less than 180 degrees, the first display area 101 and the second display area 102 are switched to the first display mode. In the first display mode, the first display area 101 displays a first screen S1 (e.g., a portrait of a participant), and the second display area 102 displays a second screen S2 (e.g., information such as text, image, or video), as shown in FIG. 6A.

Figure 6B:
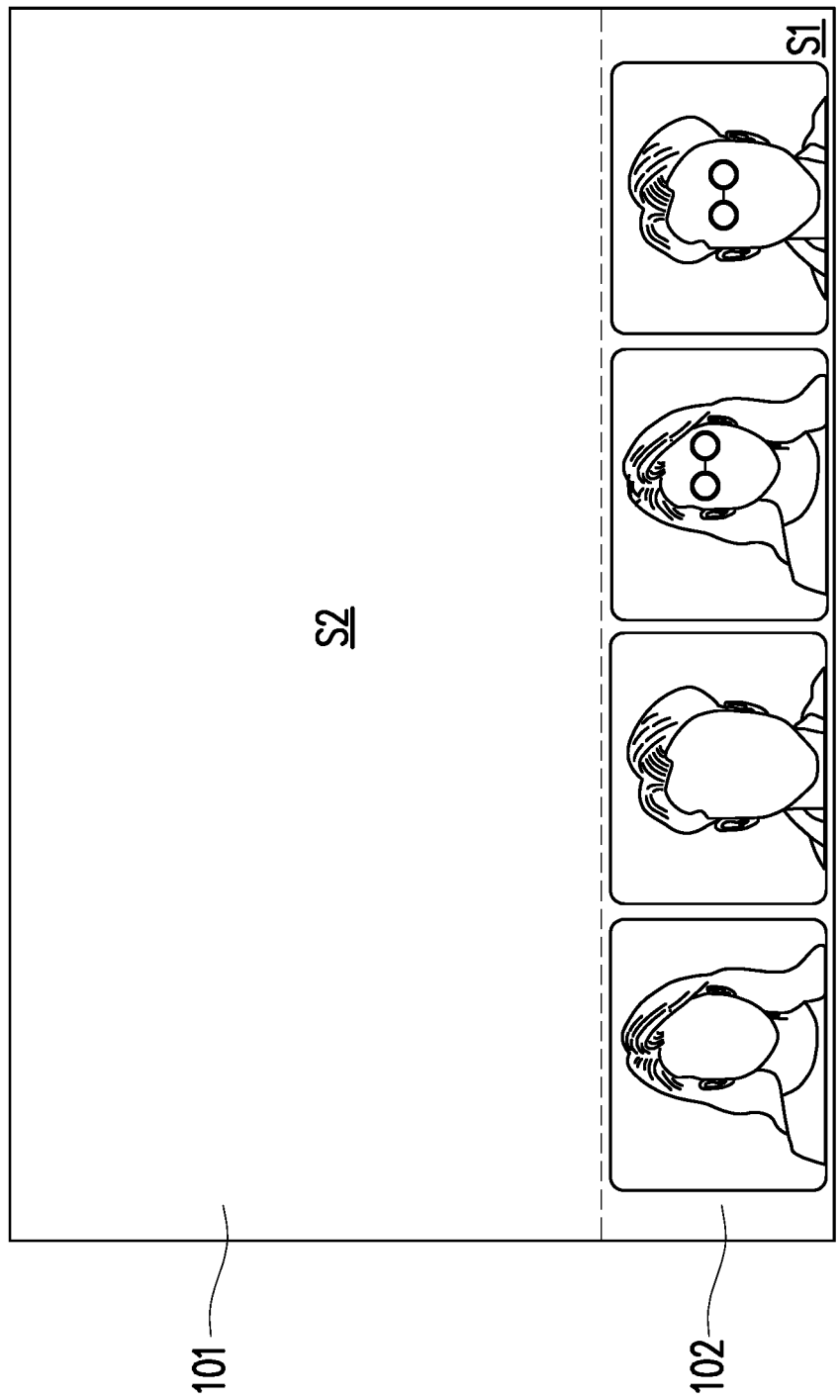

Please refer to FIG. 5, FIG. 6A, and FIG. 6B, when the first operation command is received, the display modes of the first display area 101 and the second display area 102 may be switched from the first display mode to the second display mode or switched back to the first display mode. In the second display mode, the first display area 101 displays the second screen S2 (for example, information such as text, image, or video), and the second display area 102 displays the first screen S1 (e.g., the portrait of a participant), as shown in FIG. 6B. In other embodiments, the first screen S1 displayed in the display area 101 may be a main application screen, such as a webpage or a commonly used application program screen. On the other hand, the second screen S2 displayed in the second display area 102 may include shortcuts or icons of multiple applications.

Figure 6C:
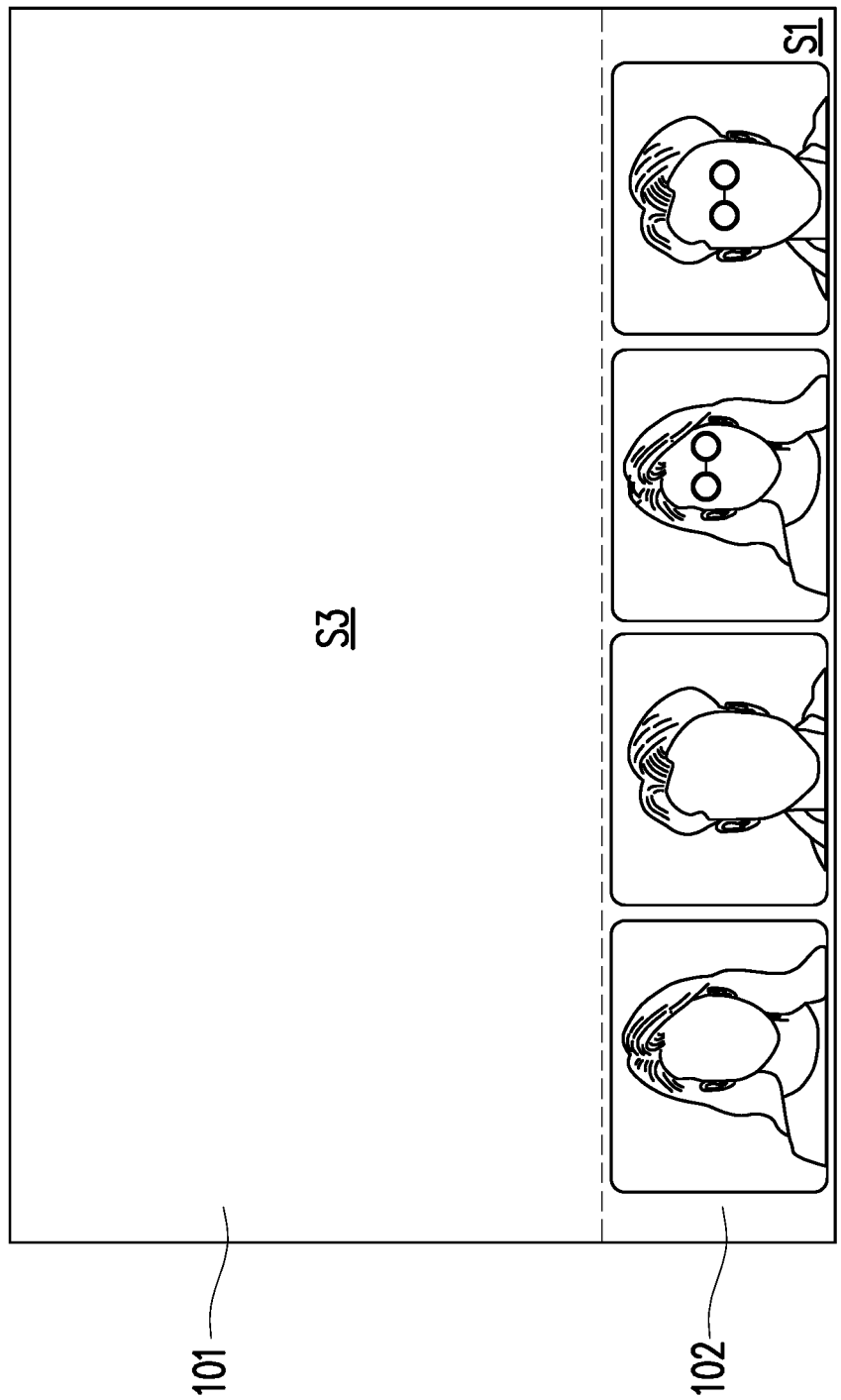

Please refer to FIG. 5, FIG. 6A, and FIG. 6C, when the second operation command is received, the display modes of the first display area 101 and the second display area 102 may be switched from the first display mode to the third display mode or switched back to the first display mode. In the third display mode, the first display area 101 displays a third screen S3 (e.g., a screen sharing screen), and the second display area 102 displays the first screen S1 (e.g., a portrait of a participant), as shown in FIG. 6C.

Please refer to FIG. 5, FIG. 6B, and FIG. 6C, when the display modes of the first display area 101 and the second display area 102 are in the second display mode or the third display mode, and a third operation command is received, the first display area 101 and the second display area 102 in the second display mode may be switched to the third display mode. Conversely, the first display area 101 and the second display area 102 in the third display mode may be switched to the second display mode.

Figure 6D:
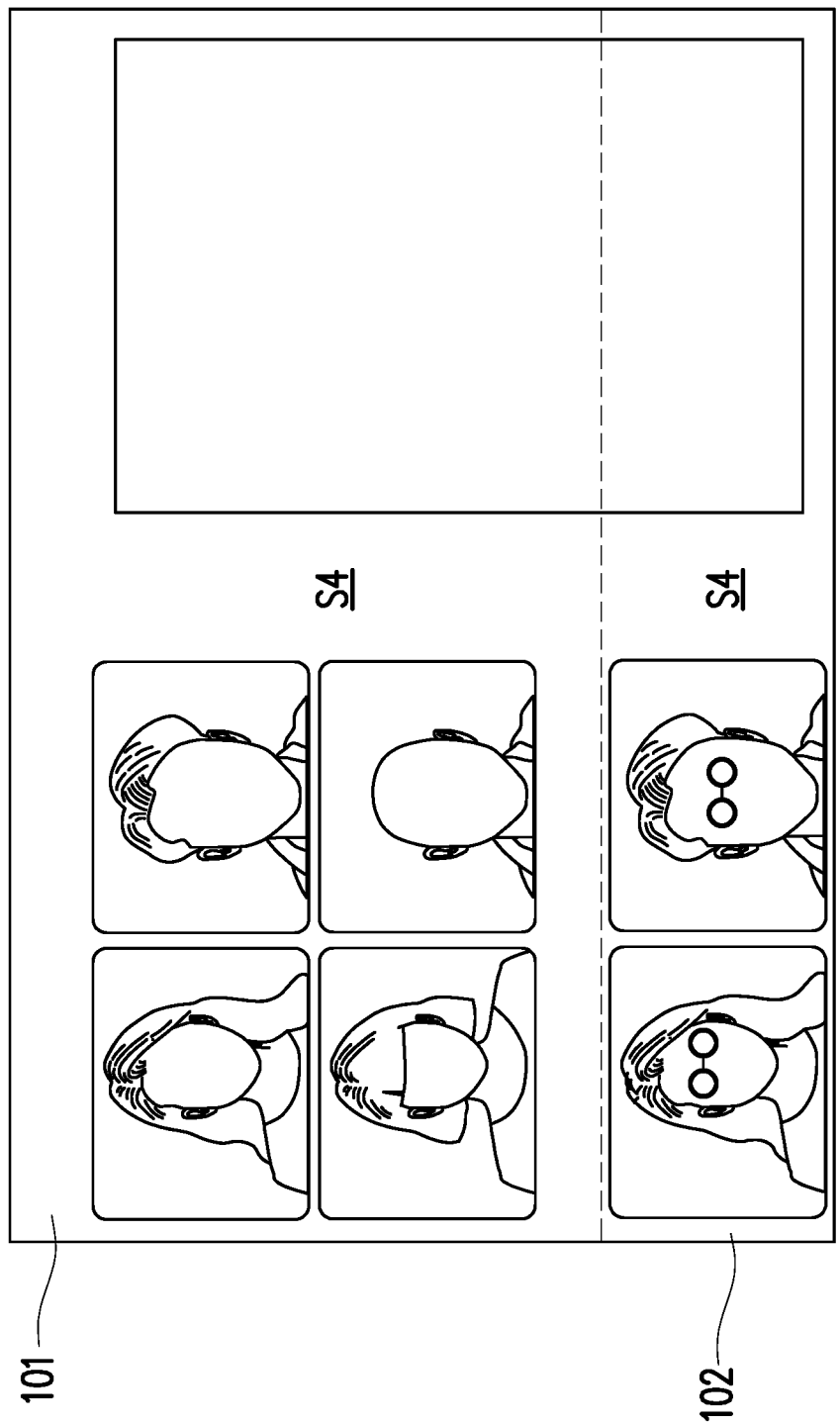

Referring to FIG. 5 and FIG. 6D, when it is sensed that the included angle between the first body 110 and the second body 120 is equal to 180 degrees, the first display area 101 and the second display area 102 are switched to the fourth display mode. In the fourth display mode, the first display area 101 and the second display area 102 jointly display a fourth screen S4, that is, the display ratio of the display content is equal to the display ratio of the first display plus the second display, such as the preset split screen of the application. In the preset split screen of the application, the left half may display the portrait of the participant, while the right half may display information such as text, image, or video. In other embodiments, the first display area 101 and the second display area 102 display a common screen, and the common screen may include computer desktop and shortcuts or icons of multiple applications, and the positions of the shortcuts or icons of the applications on the computer desktop may be adjusted according to the operation requirements of the user.

Based on the above, in the portable electronic device of the invention, the user may slide the input module according to the operation requirements, so that the second body is covered by the input module or removed from the input module to flexibly switch the operation mode, thus achieving excellent operation flexibility. Further, when the second body is covered by the input module, the angle of the first body may be adjusted. After the second body is removed from the input module, the angle of the second body may be adjusted, and the angle and height of the first body may be adjusted synchronously with the rotation of the second body, or the angle of the first body may be adjusted independently. Therefore, the portable electronic device not only improves the flexibility and comfort in operation, but also improves the user's operating experience.

In an embodiment, the first body has a first display area, and the second body has a second display area. When the second display area of the second body is covered by the input module, the user may view the screen displayed by the first display area of the first body. At this time, the angle of the first body is adjustable to adjust the viewing angle of the first display area. After the second body is removed from the input module, the second display area of the second body is not covered by the input module and is exposed to the outside. Therefore, the user may view the screen displayed in the first display area and the screen displayed in the second display area at the same time. At this time, the angle of the second body is adjustable to adjust the viewing angle of the second display area, and, the angle and height of the first body may be adjusted synchronously with the rotation of the second body, so as to adjust the viewing angle and viewing height of the first display area, or, the angle of the first body may be adjusted independently to adjust the viewing angle of the first display area. In other words, the user may slide the input module according to operation requirements to increase or decrease the number of display areas or scale the size of the display areas, thus achieving excellent operation flexibility. Moreover, since the viewing angle and viewing height of the first display area are adjustable, and the viewing angle of the second display area is adjustable, not only are the flexibility and comfort of operation improved, the user's operating experience is also improved.

In another embodiment, the speaker module may be slid along with the input module and moved out of the third body, in order to avoid the degradation of the sound performance of the speaker due to the interference of the casing of the third body or the components in the casing, thus improving the user's operating experience.

In yet another embodiment, the third body has an air outlet on a side away from the second hinge, and is covered by the input module. As the input module is slid away from the first hinge, the air outlet is not covered by the input module and is exposed to the outside to be used as another heat dissipation path for the heat dissipation module, thus not only improving the heat dissipation efficiency of the portable electronic device, but also improving the performance of the portable electronic device.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A portable electronic device, comprising:
   a first body;
   a first hinge;
   a second body pivotally connected to the first body via the first hinge;
   a second hinge;
   a third body pivotally connected to the second body via the second hinge, and the second body is located between the first body and the third body; and
   an input module slidably disposed on the third body and covering the second body, wherein the third body has a side which is away from the second hinge and the second hinge is located between the side and the first hinge, at least part of the input module is moved out from the side of the third body as the input module is slid away from the first hinge and the first body, the second body is moved out of the input module as the input module is slid away from the second hinge and the first body.

2. The portable electronic device of claim 1, wherein the second body is partially moved out of the input module as the input module is slid away from the second hinge.

3. The portable electronic device of claim 1, wherein the input module comprises a keyboard, a touch panel, or a touch display.

4. The portable electronic device of claim 1, wherein when the input module is slid close to the first hinge, the input module covers the second body, the second hinge, and the third body, and when the input module is slid away from the first hinge, the input module exposes the second body and the second hinge and covers the third body.

5. The portable electronic device of claim 1, wherein when the input module is slid close to the first hinge, the first body is adapted to be unfolded or closed at the second body via the first hinge, and when the input module is slid away from the first hinge, the first body is adapted to be unfolded or closed at the second body via the first hinge, and the second body is adapted to be unfolded or closed at the third body via the second hinge.

6. The portable electronic device of claim 1, further comprising:
   a speaker disposed in the input module.

7. The portable electronic device of claim 6, wherein when the input module is slid close to the first hinge, the speaker is accommodated in the third body, and when the input module is slid away from the first hinge, the speaker is moved out of the third body.

8. The portable electronic device of claim 1, further comprising:
   a heat dissipation module disposed in the third body, and the third body has an air outlet on a side away from the second hinge.

9. The portable electronic device of claim 8, wherein when the input module is slid close to the first hinge, the input module covers the air outlet, and when the input module is slid away from the first hinge, the input module exposes the air outlet.

10. The portable electronic device of claim 1, further comprising:
    a bottom plate disposed at a bottom of the third body.

11. The portable electronic device of claim 10, wherein a width of the third body is less than a width of the bottom plate, and the width of the bottom plate is less than a sum of a width of the second body and the width of the third body.

12. The portable electronic device of claim 10, wherein when the input module is slid close to the first hinge, the second body is closed at the bottom plate, and when the input module is slid away from the first hinge, the second body is adapted to be unfolded or closed at the bottom plate via the second hinge.

13. The portable electronic device of claim 1, further comprising:
    a camera disposed on the first body, and the first hinge is disposed between the camera and the second hinge.

14. The portable electronic device of claim 13, wherein when the input module is slid close to the first hinge, the camera and the first body are adapted to adjust a shooting angle and a shooting height via the first hinge, and when the input module is slid away from the first hinge, the camera, the first body, and the second body are adapted to adjust the shooting angle and the shooting height via the first hinge and the second hinge.

15. The portable electronic device of claim 1, further comprising:
    a functional member disposed on the second body.

16. The portable electronic device of claim 15, wherein the functional member comprises a camera, a microphone, a speaker, or a display.

17. The portable electronic device of claim 16, further comprising:
    a sensor disposed in the second body or the input module and configured to sense whether the input module covers the second body.

18. The portable electronic device of claim 17, wherein the sensor comprises a touch sensor or a proximity sensor.

19. The portable electronic device of claim 17, wherein when the input module is slid close to the first hinge, the sensor senses that the input module covers the second body, the display is in a dormant or disabled state, and when the input module is slid away from the first hinge, the sensor senses that the input module exposes the second body, and the display is in a wake-up or enabled state.

20. The portable electronic device of claim 16, wherein the display is a flexible display disposed on the first body and the second body and covering the first hinge.

21. The portable electronic device of claim 20, wherein the flexible display has a first display area and a second display area, respectively corresponding to the first body and the second body.

22. The portable electronic device of claim 21, wherein when the input module is slid close to the first hinge, the first display area and the first body are adapted to adjust an angle via the first hinge, and when the input module is slid away from the first hinge, the first display area, the first body, the second display area, and the second body are adapted to adjust an angle and a height via the first hinge and the second hinge.

23. The portable electronic device of claim 21, wherein a length of the first display area is equal to a length of the second display area, and a width of the first display area is greater than a width of the second display area.

24. The portable electronic device of claim 21, further comprising:
a first sensor disposed in the first body; and
a second sensor disposed in the second body, wherein the first sensor and the second sensor are configured to sense an included angle between the first body and the second body.

25. The portable electronic device of claim 24, wherein the first sensor and the second sensor comprise a gyroscope, a gravity sensor, or a magnetometer.

26. The portable electronic device of claim 24, wherein when a display ratio of a display content of the display is equal to a display ratio of the first display area plus the second display area, and when the included angle between the first body and the second body is less than 180 degrees, the functional member prompts a user to adjust the included angle to 180 degrees.

27. The portable electronic device of claim 24, wherein when a display ratio of a display content of the display is equal to a display ratio of the first display area, and when the included angle between the first body and the second body is equal to 180 degrees, the functional member prompts a user to adjust the included angle to less than 180 degrees.

28. The portable electronic device of claim 24, wherein when the included angle between the first body and the second body is less than 180 degrees, the first display area and the second display area are adapted to switch between a first display mode, a second display mode, and a third display mode,
in the first display mode, the first display area displays a first screen, and the second display area displays a second screen,
in the second display mode, the first display area displays the second screen, and the second display area displays the first screen,
in the third display mode, the first display area displays a third screen, and the second display area displays the first screen.

29. The portable electronic device of claim 28, wherein when the included angle between the first body and the second body is equal to 180 degrees, the first display area and the second display area are switched to a fourth display mode and display a fourth screen.

30. The portable electronic device of claim 24, wherein when the included angle between the first body and the second body is less than 180 degrees, the first display area and the second display area display two different screens, when the included angle between the first body and the second body is equal to 180 degrees, the first display area and the second display area display a common screen.

* * * * *